US010694458B2

(12) United States Patent
Takeda et al.

(10) Patent No.: US 10,694,458 B2
(45) Date of Patent: Jun. 23, 2020

(54) USER EQUIPMENT, RADIO COMMUNICATION SYSTEM, AND COMMUNICATION METHOD

(71) Applicant: NTT DOCOMO, INC., Tokyo (JP)

(72) Inventors: Shinya Takeda, Tokyo (JP); Wuri Andarmawanti Hapsari, Tokyo (JP); Shin-Ichi Isobe, Tokyo (JP); Motohiro Abe, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/315,334

(22) PCT Filed: Apr. 19, 2017

(86) PCT No.: PCT/JP2017/015674
§ 371 (c)(1),
(2) Date: Jan. 4, 2019

(87) PCT Pub. No.: WO2018/008230
PCT Pub. Date: Jan. 11, 2018

(65) Prior Publication Data
US 2019/0313326 A1   Oct. 10, 2019

(30) Foreign Application Priority Data

Jul. 8, 2016   (JP) .................................. 2016-136422

(51) Int. Cl.
*H04W 48/10* (2009.01)
*H04W 48/18* (2009.01)
(Continued)

(52) U.S. Cl.
CPC ........... *H04W 48/18* (2013.01); *H04W 28/02* (2013.01); *H04W 48/10* (2013.01); *H04W 92/12* (2013.01); *H04W 88/06* (2013.01); *H04W 88/10* (2013.01)

(58) Field of Classification Search
CPC .................................................... H04W 48/18
See application file for complete search history.

(56) References Cited

U.S. PATENT DOCUMENTS 10,051,527 B2 *   8/2018   John .................. H04W 36/0033
2016/0182711 A1   6/2016   Xing
(Continued)

OTHER PUBLICATIONS

LG Electronics; "Solution—The forward compatibility of non-standalone NR capable UE"; SA WG2 Meeting #116 S2-163374; Vienna, AT, Jul. 11-15, 2016 (3 pages).
(Continued)

*Primary Examiner* — Michael T Vu
(74) *Attorney, Agent, or Firm* — Osha Liang LLP

(57) ABSTRACT

There is provided user equipment of a radio communication system including the user equipment, a base station, and a core network apparatus including a reception unit configured to receive information indicating one or more types of NAS protocols supported by the core network apparatus from the base station; a selection unit configured to select a type of a NAS protocol to be transmitted to the core network apparatus based on the information indicating the one or more types of the NAS protocols received by the reception unit; and a transmission unit configured to transmit a NAS message of the type of the NAS protocol selected by the selection unit to the core network apparatus.

6 Claims, 18 Drawing Sheets

(51) Int. Cl.
*H04W 92/12* (2009.01)
*H04W 28/02* (2009.01)
*H04W 88/06* (2009.01)
*H04W 88/10* (2009.01)

(56) References Cited

U.S. PATENT DOCUMENTS

2016/0374137 A1* 12/2016 Adjakple .............. H04W 76/15
2017/0048695 A1* 2/2017 Ronneke ................ H04W 8/24

OTHER PUBLICATIONS

Huawei, HiSilicon; "Solution for enhanced dedicated core network selectrion"; SA WG2 Meeting #110AH S2-153082; Chengdu, China, Oct. 19-23, 2015 (8 pages).
3GPP TR 23.711 V1.0.0; "3rd Generation Partnership Project; Technical Specification Group Services and System Aspects; Enhancements of Dedicated Core Networks selection mechanism (Release 14)"; May 2016 (35 pages).
LG Electronics; "Migration solution with Evolved E-UTRAN to operator with an EPC and a NextGen Core simultaneously"; SA WG2 Meeting #116BIS S2-164423; Aug. 29-Sep. 2, 2016, Sanya, P.R. China (4 pages).
Qualcomm Incorporated, NTT Docomo; "Solution for interworking and migration"; SA WG2 Meeting #116 S2-163391; Jul. 11-15, 2016, Vienna, AT (7 pages).
3GPP TR 23.799 V0.5.0; "3rd Generation Partnership Project; Technical Specification Group Services and System Aspects; Study on Architecture for Next Generation System (Release 14)"; May 2016 (178 pages).
International Search Report issued for PCT/JP2017/015674, dated Jul. 4, 2017 (5 pages).
Written Opinion issued for PCT/JP2017/015674, dated Jul. 4, 2017 (5 pages).
Extended European Search Report in counterpart European Patent Application No. 17823838.2 dated Jan. 23, 2020 (9 pages).
3GPP TR 23.711 V0.2.0; "3rd Generation Partnership Project; Technical Specification Group Services and System Aspects; Enhancements of Dedicated Core Networks selection mechanism (Release 14)"; Nov. 2015 (20 pages).

* cited by examiner

USER EQUIPMENT, RADIO COMMUNICATION SYSTEM, AND COMMUNICATION METHOD

TECHNICAL FIELD

The present invention relates to user equipment, a radio communication system, and a communication method.

BACKGROUND ART

In Long Term Evolution (LTE), a radio communication scheme referred to as 5G has been studied to achieve larger capacity of systems, further acceleration of data transmission speeds, further reduction of latency in radio sections, and the like.

Radio communication systems configured to support 5G radio access technology (new Radio Access Technology (RAT)), evolved E-URTA, and an access technology other than 3GPP (non-3GPP access type) have been studied along with the study of 5G radio communication schemes (for example, see Non-Patent Document 1). According to Non-Patent Document 1, the radio communication system is referred to as a next generation system. The next generation system includes a next generation core network.

PRIOR ART DOCUMENT

Non-Patent Document

Non-Patent Document 1: 3GPP TR23.799 V0.5.0 (2016-05)

SUMMARY OF THE INVENTION

Problem to be Solved by the Invention

Meanwhile, 5G network architectures have currently started to be studied in 3GPP. Specifically, a network architecture in which 5G is supported by both a radio access network (RAN) and a core network (core NW: CN), a network architecture in which 5G is supported by only an RAN and a CN supporting conventional LTE is utilized in regard to the CNs, and a network architecture in which an RAN supports 5G and a CN supporting conventional LTE and a CN supporting 5G are included in regard to the CNs have been examined.

However, in current 3GPP regulations, there is no structure that enables a UE to use an appropriate Non-Access Stratum (NAS) protocol according to a network architecture.

A disclosed technology has been developed in view of the foregoing problem and an object is to provide a technology for enabling a UE to use an appropriate NAS protocol according to a network architecture.

Means for Solving the Problem

A UE according to the disclosed technology is user equipment of a radio communication system including the user equipment, a base station, and a core network apparatus, the user equipment including a reception unit configured to receive information indicating one or more types of NAS protocols supported by the core network apparatus from the base station; a selection unit configured to select a type of a NAS protocol to be transmitted to the core network apparatus based on the information indicating the one or more types of the NAS protocols received by the reception unit; and a transmission unit configured to transmit a NAS message of the type of the NAS protocol selected by the selection unit to the core network apparatus.

Advantage of the Invention

According to the technology of the present disclosure, it is possible to provide a technology for enabling a UE to use an appropriate NAS protocol according to a network architecture.

EMBODIMENTS OF THE INVENTION

Hereinafter, embodiments of the invention will be described with reference to the drawings. The embodiments to be described below are merely examples and embodiments to which the invention is applied are not limited to the following embodiments.

<Network Architecture Examined in 3GPP>

Figure 1A:
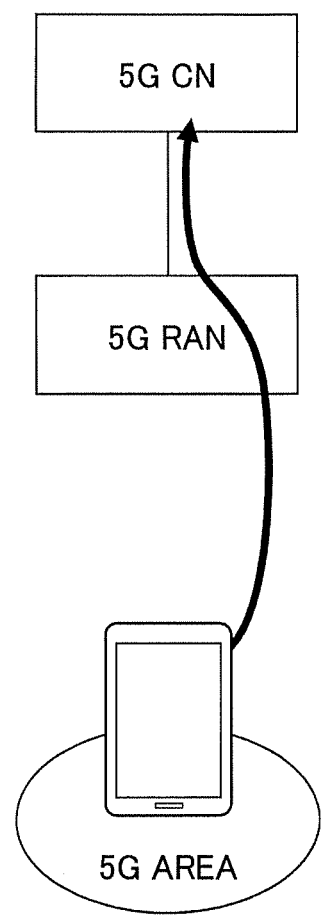
FIG. 1A is a diagram illustrating examples of network architectures examined in 3GPP.

At present, 5G network architectures have started to be examined in 3GPP. FIG. 1A illustrates a network architecture in which 5G is supported by both an RAN and a CN. In the case of FIG. 1A, user equipment (UE) is assumed to perform communication with an RAN and a CN using a 5G access stratum (AS) protocol and a 5G non-access stratum (NAS) protocol. The AS protocol is a protocol used between a UE and a base station and the NAS protocol is a protocol used between a UE and a CN.

Figure 1B:
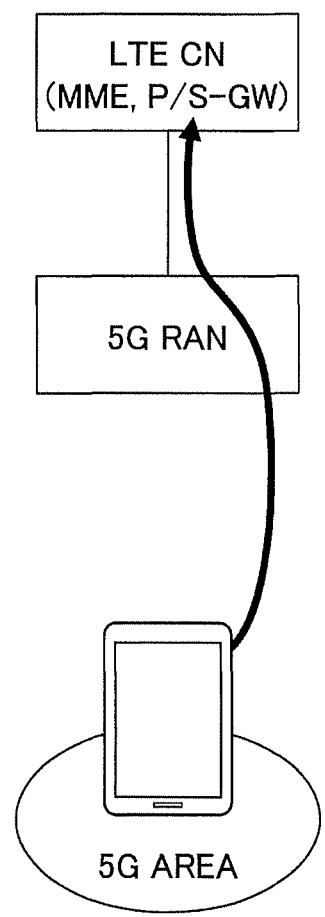
FIG. 1B is a diagram illustrating examples of network architectures examined in 3GPP.

FIG. 1B illustrates a network architecture in which 5G is supported by only an RAN and a CN supporting conventional LTE is utilized in regard to the CNs. In the case of FIG. 1B, a UE is assumed to perform communication with an RAN and a CN using a 5G AS protocol and an LTE NAS protocol.

Figure 1C:
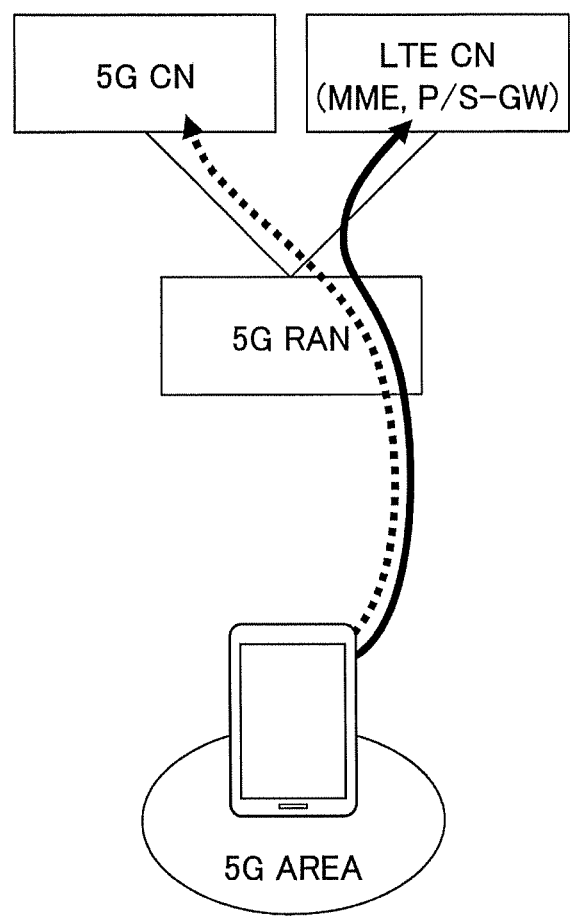
FIG. 1C is a diagram illustrating examples of network architectures examined in 3GPP.

FIG. 1C illustrates a network architecture in which an RAN supports 5G and a CN supporting conventional LTE and a CN supporting 5G are included in regard to the CNs. In the case of FIG. 1C, a UE is assumed to perform communication with an RAN and a CN using a 5G AS protocol, an LTE NAS protocol, and a 5G NAS protocol.

In future, it is considered that which network architecture is adopted is decided among a plurality of network architectures according to a policy or the like of an operator. Accordingly, it is necessary for a UE to ascertain a network architecture of a network to be connected, determines whether an LTE NAS protocol is used or a 5G NAS protocol is used, and uses an appropriate NAS protocol.

<System Configuration>

Figure 2:
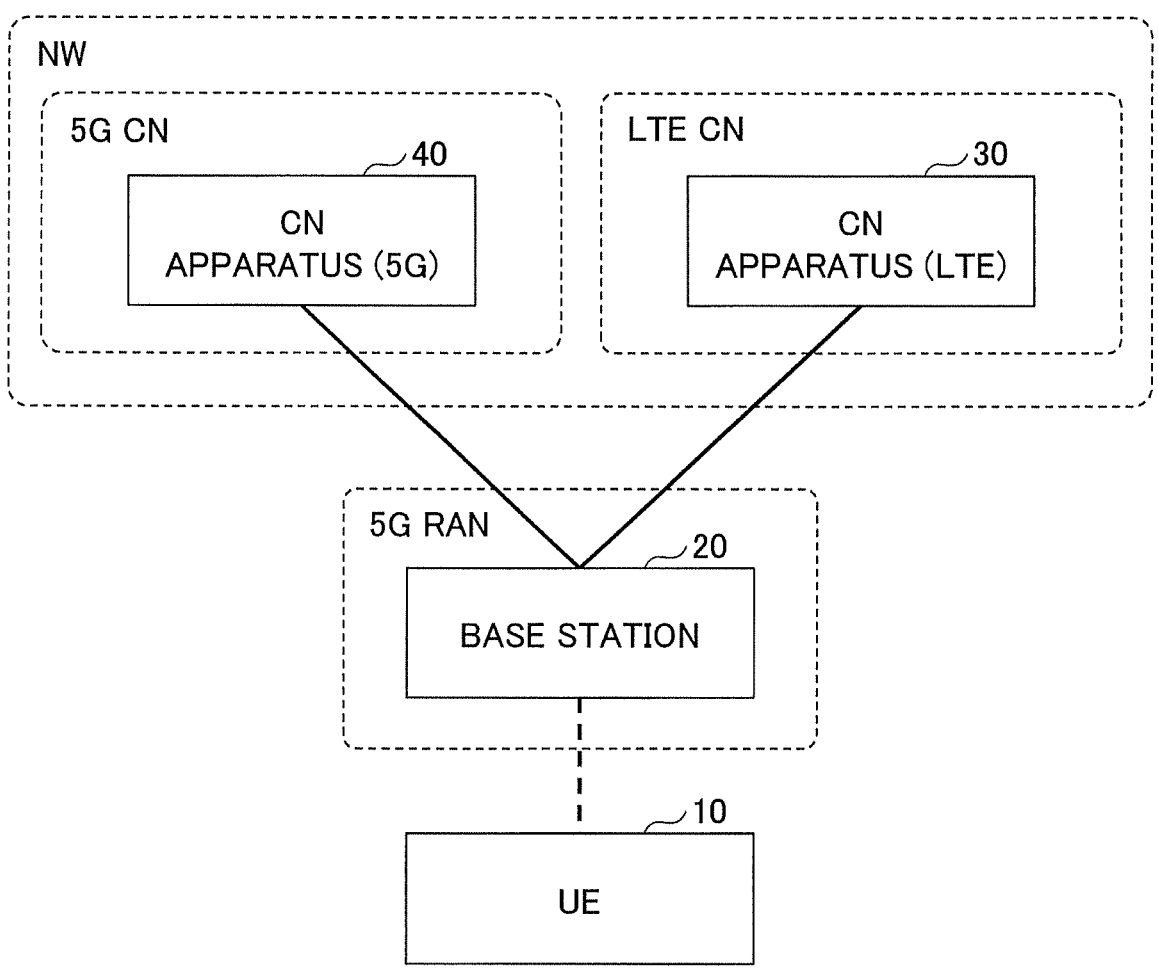
FIG. 2 is a diagram illustrating a configuration example of a radio communication system according to an embodiment.

FIG. 2 is a diagram illustrating a configuration example of a radio communication system according to an embodiment. As illustrated in FIG. 2, the radio communication system according to the embodiment includes a UE 10, a base station 20, a CN apparatus (LTE) 30, and a CN apparatus (5G) 40. In FIG. 2, one UE 10, one base station 20, one CN apparatus (LTE) 30, and one CN apparatus (5G) 40 are illustrated, but two or more UEs, two or more base stations, two or more CN apparatuses (LTE), and two or more CN apparatuses (5G) may be provided. In the following description, the CN apparatus (LTE) 30 and the CN apparatus (5G) 40 are collectively referred to as "CN apparatuses" or "NWs (networks)."

The UE 10 may be the UE 10 that supports LTE (that is, supports an LTE NAS protocol), may be the UE 10 that supports 5G (that is, supports a 5G NAS protocol), or may be the UE 10 that supports both LTE and 5G (that is, supports both an LTE NAS protocol and a 5G NAS protocol).

The base station 20 is a base station that supports 5G RAT and has a function of establishing an interface (connection) between the base station 20 and a CN apparatus so that an NAS message transmitted and received between the UE 10 and the CN apparatus can be transmitted to the CN apparatus.

The CN apparatus (LTE) 30 has a function of performing various call processes such as attachment and position registration by receiving an NAS message of an LTE NAS protocol.

The CN apparatus (5G) 40 has a function of performing various call processes such as attachment and position registration by receiving an NAS message of a 5G NAS protocol.

The radio communication system according to an embodiment is assumed to support one of the network architectures described in FIG. 1. Therefore, when the network architecture illustrated in FIG. 1A is supported, the CN apparatus (LTE) 30 may not be included in the radio communication system. When the network architecture illustrated in FIG. 1B is supported, the CN apparatus (5G) 40 may not be included in the radio communication system.

<Functional Configuration>

(UE)

Figure 3A:
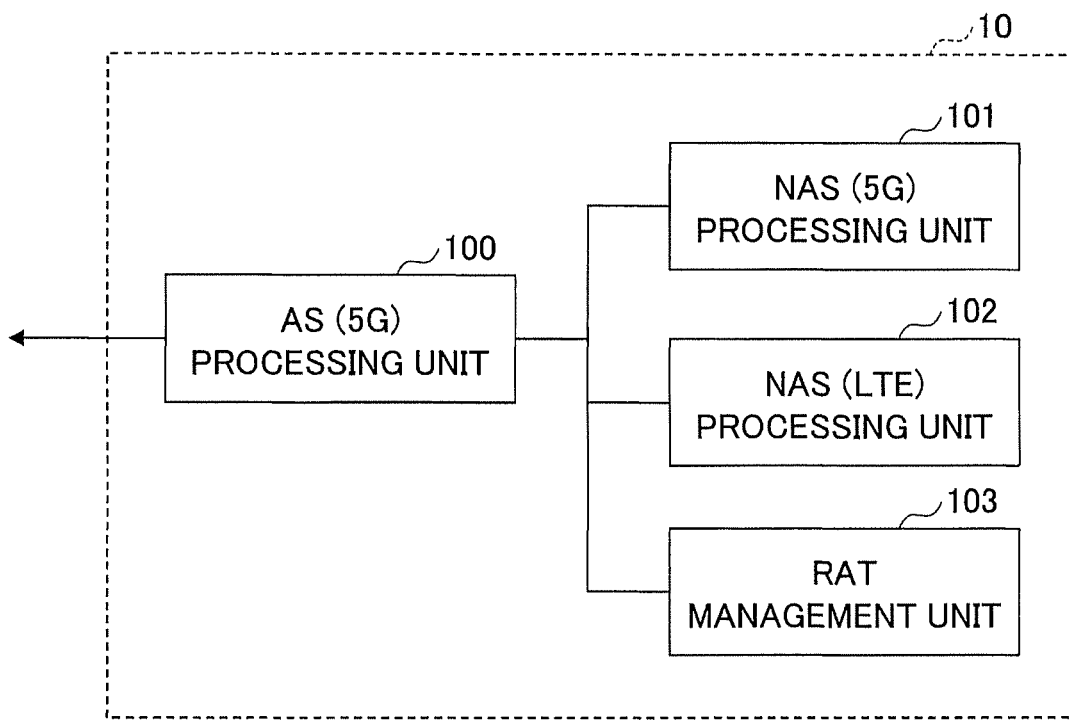
FIG. 3A is a diagram illustrating an example of a functional configuration of a UE according to the embodiment.

FIG. 3A is a diagram illustrating an example of a functional configuration of the UE according to the embodiment. As illustrated in FIG. 3A, the UE 10 includes an AS (5G) processing unit 100, an NAS (5G) processing unit 101, an NAS (LTE) processing unit 102, and an RAT management unit 103. FIG. 3A illustrates only function units of the UE 10 particularly related to the embodiment of the invention. The functional configuration illustrated in FIG. 3A is merely an example. Any functional division and any names of functional units may be used as long as an operation according to the embodiment can be performed.

The AS (5G) processing unit 100 has a function of processing various radio signals of layers 1 to 3 of 5G transmitted to and received from the base station 20 using AS protocols (for example, the physical layer (PHY), the medium access control (MAC), the packet data convergence protocol (PDCP), the radio link control (RLC), and the radio resource control (RRC)).

The AS (5G) processing unit 100 has a function of receiving information indicating types of NAS protocols supported by the CN apparatus from the base station 20. The AS (5G) processing unit 100 has a function of transmitting information indicating use of an NAS message of a type of NAS protocol selected by the RAT management unit 103 to the base station 20.

The NAS (5G) processing unit 101 supports the 5G NAS protocol and has a function of transmitting and receiving an NAS message of the 5G NAS protocol to and from the CN apparatus (5G) 40 via the AS (5G) processing unit 100. The NAS (5G) processing unit 101 has a function of transmitting an NAS message of a type of 5G NAS protocol to the CN apparatus (5G) 40 when the 5G NAS protocol is selected by the RAT management unit 103.

The NAS (LTE) processing unit 102 supports an LTE NAS protocol and has a function of transmitting and receiving an NAS message of an LTE NAS protocol to and from the CN apparatus (LTE) 30 via the AS (5G) processing unit 100. The NAS (LTE) processing unit 102 has a function of transmitting an NAS message of a type of LTE NAS protocol to the CN apparatus (LTE) 30 when the LTE NAS protocol is selected by the RAT management unit 103.

The RAT management unit 103 has a function of selecting a type of NAS protocol to be transmitted to the CN apparatus based on information indicating the type of NAS protocol supported by the CN apparatus and received by the AS (5G) processing unit 100. The RAT management unit 103 may select the type of NAS protocol to be transmitted to the CN apparatus based on predetermined priority when the CN apparatus supports a plurality of types of NAS protocols (both a 5G NAS protocol and an LTE NAS protocol). The RAT management unit 103 may select the type of NAS protocol to be transmitted to the CN apparatus based on the information indicating the type of NAS protocol supported by the CN apparatus and the type of NAS protocol supported by the UE 10.

When the base station 20 or the CN apparatus notifies the UE 10 that the type of 5G NAS protocol is not supported in the CN apparatus, the RAT management unit 103 may select the type of LTE NAS protocol as the type of NAS protocol used for the NAS message and notify the NAS (LTE) processing unit 102 that the type of LTE NAS protocol is selected. When the base station 20 or the CN apparatus notifies the UE 10 that the LTE NAS protocol is not supported in the CN apparatus, the RAT management unit 103 may select the type of 5G NAS protocol as the type of NAS protocol used for the NAS message and notify the NAS (5G) processing unit 101 that the type of 5G NAS protocol is selected.

(Base Station)

Figure 3B:
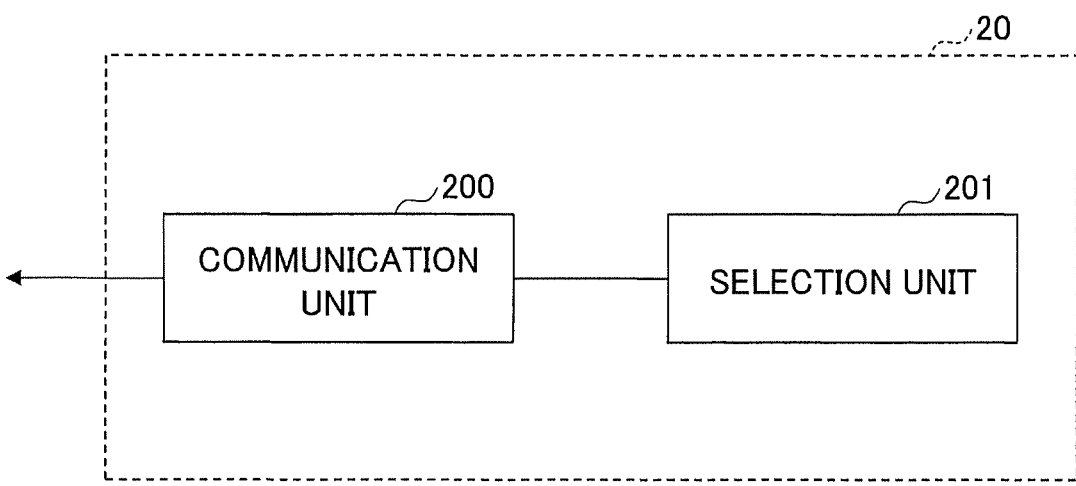
FIG. 3B is a diagram illustrating an example of a functional configuration of a base station according to the embodiment.

FIG. 3B is a diagram illustrating an example of a functional configuration of a base station according to the embodiment. As illustrated in FIG. 3(b), the base station 20 includes a communication unit 200 and a selection unit 201. FIG. 3B illustrates only functions of the base station 20 particularly related to the embodiment of the invention. The functional configuration illustrated in FIG. 3B is merely an example. Any functional division and any names of functional units may be used as long as an operation according to the embodiment can be performed.

The communication unit 200 has a function of processing various radio signals of layers 1 to 3 of 5G transmitted to and received from the UE 10 using AS protocols (for example, the PHY, the MAC, the PDCP, the RLC, and the RRC). The communication unit 200 has a function of establishing an interface (connection) to transmit and receive an NAS message to and from the CN apparatus (LTE) 30 and/or the CN apparatus (LTE) 30 using a predetermined protocol (for example, S1-AP).

The selection unit 201, based on the notification from the UE 10, has a function of selecting an interface (connection) established to transmit and receive the NAS message with the CN apparatus (LTE) 30 and/or selecting the interface with the CN apparatus (5G) 40 and notifying the communication unit 200 that the interface is established.

<Hardware Configuration>

The block diagram (see FIGS. 3A and 3B) used to describe the above-described functional configuration illustrates blocks of functional units. The functional blocks (constituent elements) are realized by any combination of hardware and/or software. In addition, means for realizing each functional block is not particularly limited. That is, each functional block may be realized by one apparatus in which the functional blocks are combined physically and/or logically or may be realized by two or more apparatuses that are physically and/or logically separated by connecting the plurality of apparatuses directly and/or indirectly (for example, in a wired and/or wireless manner).

Figure 4:
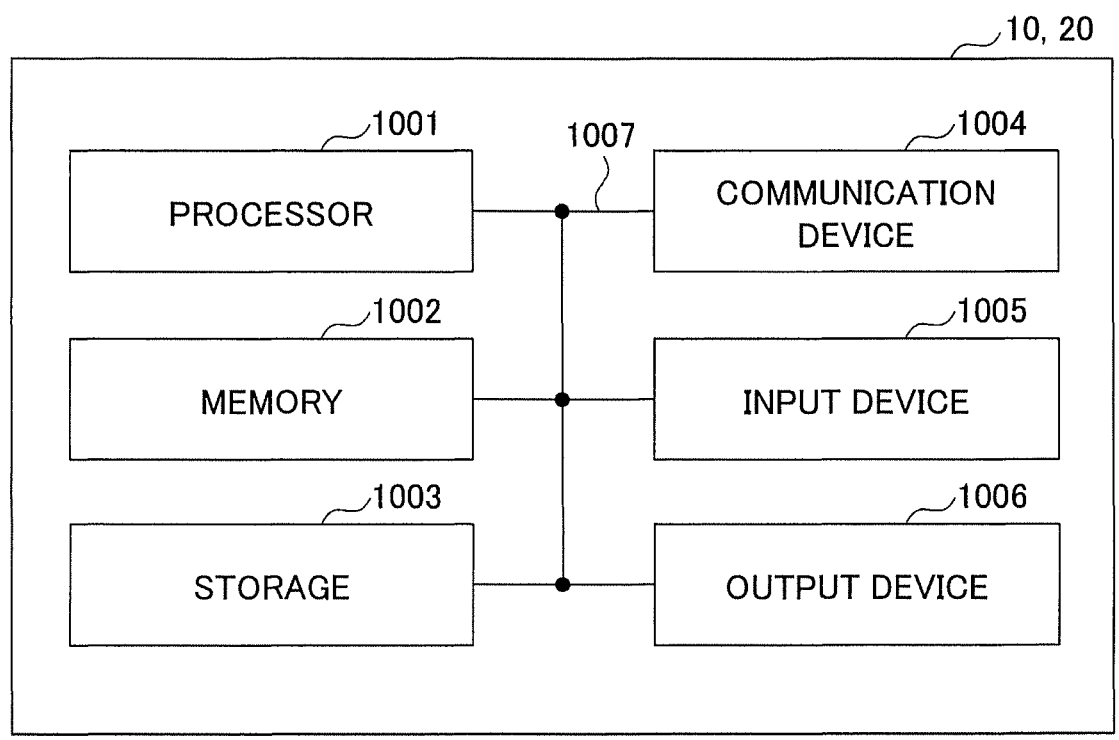
FIG. 4 is a diagram illustrating an example of a hardware configuration of the UE and the base station according to the embodiment.

For example, the UE 10 and the base station 20 according to the embodiment of the invention may function as a computer that performs a process for a communication method according to an embodiment of the invention. FIG. 4 is a diagram illustrating an example of a hardware configuration of the UE and the base station according to the embodiment. The above-described UE 10 and base station 20 may be physically configured as a computer apparatus that includes a processor 1001, a memory 1002, a storage 1003, a communication apparatus 1004, an input apparatus 1005, an output apparatus 1006, and a bus 1007.

In the following description, a term "apparatus" can be replaced with a circuit, a device, a unit, or the like. The hardware configuration of the UE 10 and base station 20 may be configured to include one apparatus or a plurality of apparatuses illustrated in the drawing or may be configured not to include some of the apparatuses.

The functions of the UE 10 and base station 20 are realized by reading predetermined software (program) on hardware such as the processor 1001 or the memory 1002 so that the processor 1001 can perform an arithmetic operation and controlling communication by the communication apparatus 1004 and reading and/or writing of data in the memory 1002 and the storage 1003.

For example, the processor 1001 controls the entire computer by operating an operating system. The processor 1001 may also be configured as a central processing unit (CPU) that includes an interface with a peripheral apparatus, a control apparatus, an arithmetic apparatus, and a register. For example, the AS (5G) processing unit 100, the NAS (5G) processing unit 101, the NAS (LTE) processing unit 102, and the RAT management unit 103 of the UE 10 and the communication unit 200 and the selection unit 201 of the base station 20 may be realized by the processor 1001.

The processor 1001 reads a program (program codes), a software module, or data from the storage 1003 and/or the communication apparatus 1004 to the memory 1002 and performs various processes according to the program, the software module, or the data. As the program, a program causing a computer to perform at least some of the operations described in each of the foregoing embodiment is used. For example, the processes by the AS (5G) processing unit 100, the NAS (5G) processing unit 101, the NAS (LTE) processing unit 102, and the RAT management unit 103 of the UE 10 and the communication unit 200 and the selection unit 201 of the base station 20 may be realized by a control program that is stored in the memory 1002 and is operated by the processor 1001 or may be realized similarly in another functional block. The above-described various processes performed by one processor 1001 have been described, but may be performed simultaneously or sequentially by two or more processors 1001. The processor 1001 may be mounted on one or more chips. The program may be transmitted from a network via an electric communication circuit.

The memory 1002 is a computer-readable recording medium and may be configured by at least one of, for example, a read-only memory (ROM), an erasable programmable ROM (EPROM), an electrically erasable programmable ROM (EEPROM), and a random access memory (RAM). The memory 1002 may also be referred to as a register, a cache, a main memory (main storage apparatus), or the like. The memory 1002 can store a program (program codes), a software module, or the like which can be executed to perform a communication method according to each embodiment of the invention.

The storage 1003 is a computer-readable recording medium and may be configured by at least one of, for example, an optical disc such as a compact disc ROM (CD-ROM), a hard disk drive, a flexible disc, a magneto-optical disc (for example, a compact disc, a digital versatile disk, a Blu-ray (registered trademark) disc), a smart card, a flash memory (for example, a card, a stick, or a key drive), a floppy (registered trademark) disk, and a magnetic script. The storage 1003 may also be referred to as an auxiliary storage apparatus. The above-described storage medium may be, for example, a database or a server including the memory 1002 and/or the storage 1003 or another appropriate medium.

The communication apparatus 1004 is hardware (a transmission and reception device) that performs communication between computers via a wired and/or wireless network and is also referred to as, for example, a network device, a network controller, a network card, or a communication module. For example, the AS (5G) processing unit 100 of the UE 10 and the communication unit 200 of the base station 20 may be realized by the communication apparatus 1004.

The input apparatus 1005 is an input device (for example, a keyboard, a mouse, a microphone, a switch, a button, or a sensor) that receives an input from the outside. The output apparatus 1006 is an output device (for example, a display, a speaker, or an LED lamp) that performs an output to the outside. The input apparatus 1005 and the output apparatus 1006 may be configured to be integrated (for example, a touch panel).

The apparatuses such as the processor 1001 and the memory 1002 are connected to the bus 1007 communicating information. The bus 1007 may be configured as a single bus or may be configured by different buses between the apparatuses.

The UE 10 and base station 20 may be configured to include hardware such as a microprocessor, a digital signal processor (DSP), an application specific integrated circuit (ASIC), a programmable logic device (PLD), or a field programmable gate array (FPGA), or some or all of the functional blocks may be realized by the hardware. For example, the processor 1001 may be mounted as at least one of the hardware.

<Process Procedure>

Next, a process procedure in which the radio communication system according to the embodiment will be described separately according to a plurality of embodiments.

First Embodiment

In a first embodiment, the UE 10 is notified of the type of NAS protocol supported by the NW using report information (also referred to as broadcast information or system information). Then, the UE 10 selects the type of NAS protocol to be transmitted to the CN based on the type of NAS protocol supported by the CN.

Figure 5:
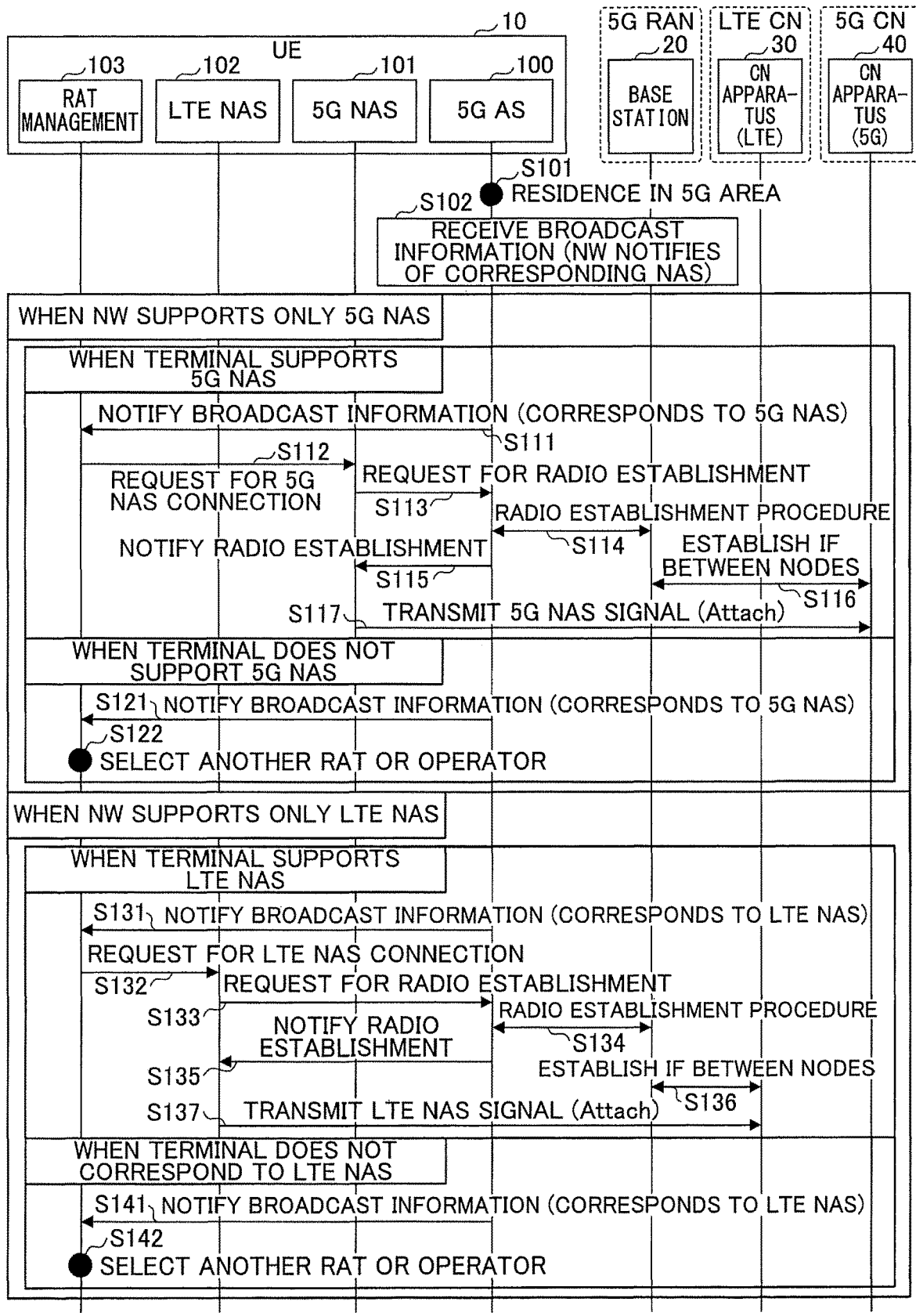
FIG. 5 is a sequence diagram illustrating an example of a process procedure performed by a radio communication system according to a first embodiment.
Figure 6:
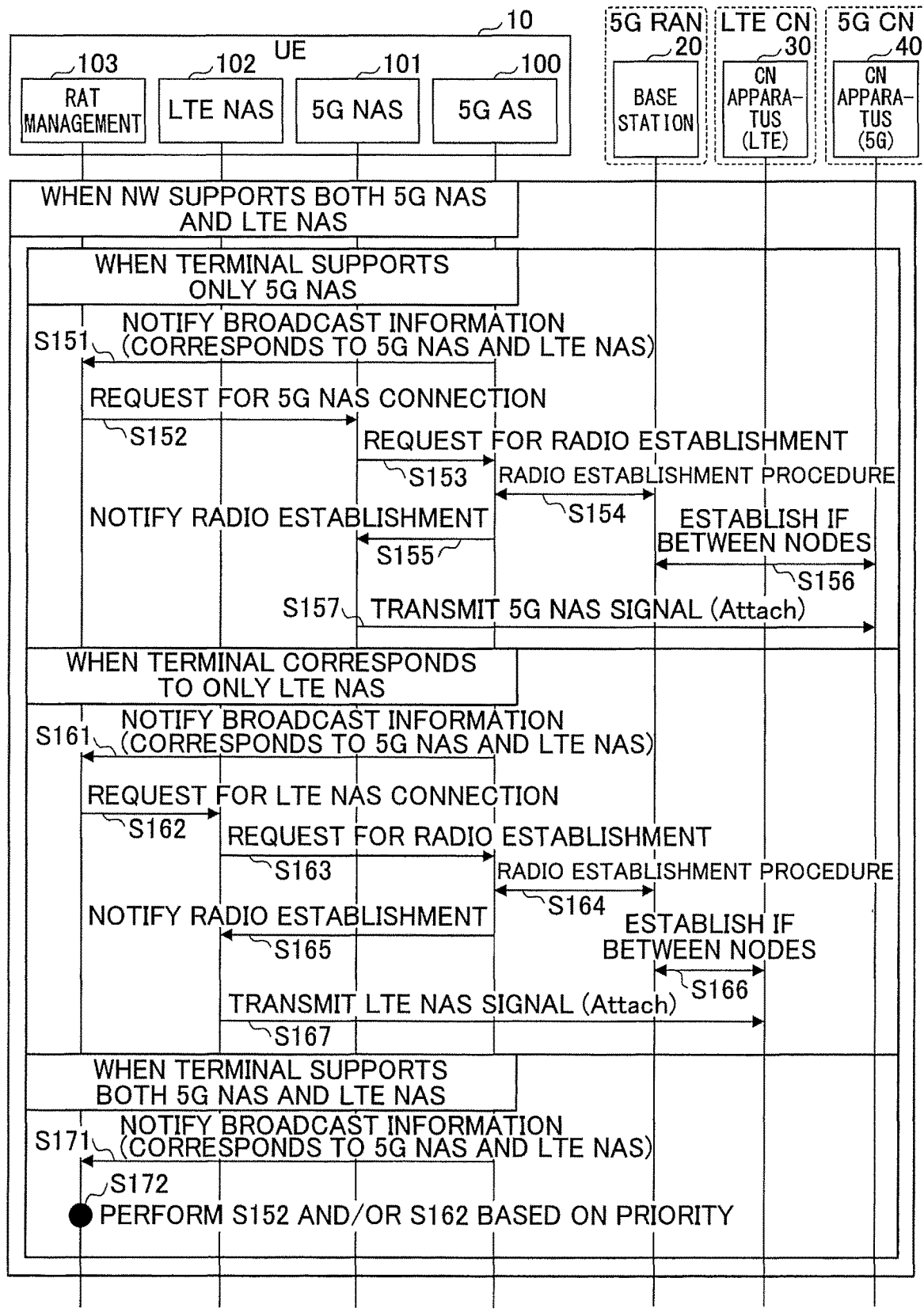
FIG. 6 is a sequence diagram illustrating an example of a process procedure performed by the radio communication system according to the first embodiment.

FIGS. 5 and 6 are sequence diagrams illustrating an example of a process procedure performed by a radio communication system according to a first embodiment.

The AS (5G) processing unit 100 of the UE 10 detects residence in a 5G area (S101) and receives report information from the base station 20 (S102). The report information includes the type of NAS protocol supported by the NW.

When the NW corresponds to only the 5G NAS protocol and the UE 10 corresponds to the 5G NAS protocol, the AS (5G) processing unit 100 of the UE 10 notifies the RAT management unit 103 that the NW corresponds to only the 5G NAS protocol (S111). The RAT management unit 103 requests the NAS (5G) processing unit 101 to perform NAS connection using the 5G NAS protocol (S112). The NAS (5G) processing unit 101 notifies the AS (5G) processing unit 100 of a radio establishment request (S113). The AS (5G) processing unit 100 performs a radio establishment procedure with the base station 20 (S114). The AS (5G) processing unit 100 notifies the NAS (5G) processing unit 101 that the radio establishment procedure is completed (S115). The communication unit 200 of the base station 20 establishes an interface (connection) to transmit and receive an NAS message with the CN apparatus (5G) 40 (S116). The NAS (5G) processing unit 101 of the UE 10 transmits an NAS message (attachment) of the 5G NAS protocol to the CN apparatus (5G) 40 (S117).

When the NW corresponds to only the 5G NAS protocol and the UE 10 does not correspond to the 5G NAS protocol, the AS (5G) processing unit 100 of the UE 10 notifies the RAT management unit 103 that the NW corresponds to only the 5G NAS protocol (S121). Since the UE 10 does not correspond to the 5G NAS protocol, the RAT management unit 103 selects residence in an area of another RAT (for example, LTE) area or an area of another operator (S122).

When the NW corresponds to only the LTE NAS protocol and the UE 10 corresponds to the LTE NAS protocol, the AS (5G) processing unit 100 of the UE 10 notifies the RAT management unit 103 that the NW corresponds to only the LTE NAS protocol (S131). The RAT management unit 103 requests the NAS (LTE) processing unit 102 to perform NAS connection using the LTE NAS protocol (S132). The NAS (LTE) processing unit 102 notifies the AS (5G) processing unit 100 of a radio establishment request (S133). The AS (5G) processing unit 100 performs a radio establishment procedure with the base station 20 (S134). The AS (5G) processing unit 100 notifies the NAS (LTE) processing unit 102 that the radio establishment procedure is completed (S135). The communication unit 200 of the base station 20 establishes an interface (connection) to transmit and receive an NAS message with the CN apparatus (LTE) 30 (S136). The NAS (LTE) processing unit 102 of the UE 10 transmits an NAS message (attachment) of the LTE NAS protocol to the CN apparatus (LTE) 30 (S137).

When the NW corresponds to only the LTE NAS protocol and the UE 10 does not correspond to the LTE NAS protocol, the AS (5G) processing unit 100 of the UE 10 notifies the RAT management unit 103 that the NW corresponds to only the LTE NAS protocol (S141). Since the UE 10 does not correspond to the LTE NAS protocol, the RAT management unit 103 selects residence in an area of another RAT (for example, 5G) area or an area of another operator (S142).

When the NW corresponds to both the 5G NAS protocol and the LTE NAS protocol and the UE 10 corresponds to only the 5G NAS protocol, the AS (5G) processing unit 100 of the UE 10 notifies the RAT management unit 103 that the NW corresponds to both the 5G NAS protocol and the LTE NAS protocol (S151). The RAT management unit 103 requests the NAS (5G) processing unit 101 to perform NAS connection using the 5G NAS protocol (S152). The NAS (5G) processing unit 101 notifies the AS (5G) processing unit 100 of a radio establishment request (S153). The AS (5G) processing unit 100 performs a radio establishment procedure with the base station 20 (S154). In the radio establishment procedure, the AS (50) processing unit 100 notifies the base station 20 that the NAS message of the 5G NAS protocol is scheduled to be transmitted. The AS (5G) processing unit 100 notifies the NAS (5G) processing unit 101 that the radio establishment procedure is completed (S155). The communication unit 200 of the base station 20 establishes an interface (connection) to transmit and receive an NAS message with the CN apparatus (5G) 40 based on the notification (S156). The NAS (5G) processing unit 101 of the UE 10 transmits an NAS message (attachment) of the 5G NAS protocol to the CN apparatus (5G) 40 (S157).

When the NW corresponds to both the 5G NAS protocol and the LTE NAS protocol and the UE 10 corresponds to only the LTE NAS protocol, the AS (5G) processing unit 100 of the UE 10 notifies the RAT management unit 103 that the NW corresponds to both the 5G NAS protocol and the LTE NAS protocol (S161). The RAT management unit 103 requests the NAS (LTE) processing unit 102 to perform NAS connection using the LTE NAS protocol (S162). The NAS (LTE) processing unit 102 notifies the AS (5G) processing unit 100 of a radio establishment request (S163). The AS (5G) processing unit 100 performs a radio establishment procedure with the base station 20 (S164). In the radio establishment procedure, the AS (5G) processing unit 100 notifies the base station 20 that an NAS message of the LTE NAS protocol is scheduled to be transmitted. The AS (5G) processing unit 100 notifies the NAS (LTE) processing unit 102 that the radio establishment procedure is completed (S165). The communication unit 200 of the base station 20 establishes an interface (connection) to transmit and receive an NAS message with the CN apparatus (LTE) 30 based on the notification (S166). The NAS (LTE) processing unit 102 of the UE 10 transmits an NAS message (attachment) of the LTE NAS protocol to the CN apparatus (LTE) 30 (S167).

When the NW and the UE 10 correspond to both the 5G NAS protocol and the LTE NAS protocol, respectively, the AS (5G) processing unit 100 of the UE 10 notifies the RAT management unit 103 that the NW corresponds to both the 5G NAS protocol and the LTE NAS protocol (S171). The RAT management unit 103 performs the NAS connection using the LTE NAS protocol based on information indicating priority and selects whether to perform NAS connection using the 5G NAS protocol (S172). When the NAS connection is performed using the 5G NAS protocol, the process proceeds to the process procedure of step S152. When the NAS connection is performed using the LTE NAS protocol, the process proceeds to the process procedure of S162. The RAT management unit 103 may perform both of the process procedure of step S152 and the process procedure of step S162 to attach both the CN apparatus (LTE) 30 and the CN apparatus (5G) 40.

The first embodiment has been described above. According to the first embodiment, the UE 10 can select the type of NAS protocol to be transmitted to the CN based on the type of NAS protocol supported by the CN.

Second Embodiment

In a second embodiment, in a radio establishment procedure performed between the UE 10 and the base station 20, the base station 20 notifies the UE 10 of a type of NAS protocol supported by an NW and the UE 10 selects the type of NAS protocol to be transmitted to the CN based on the type of NAS protocol supported by the CN.

Figure 7:
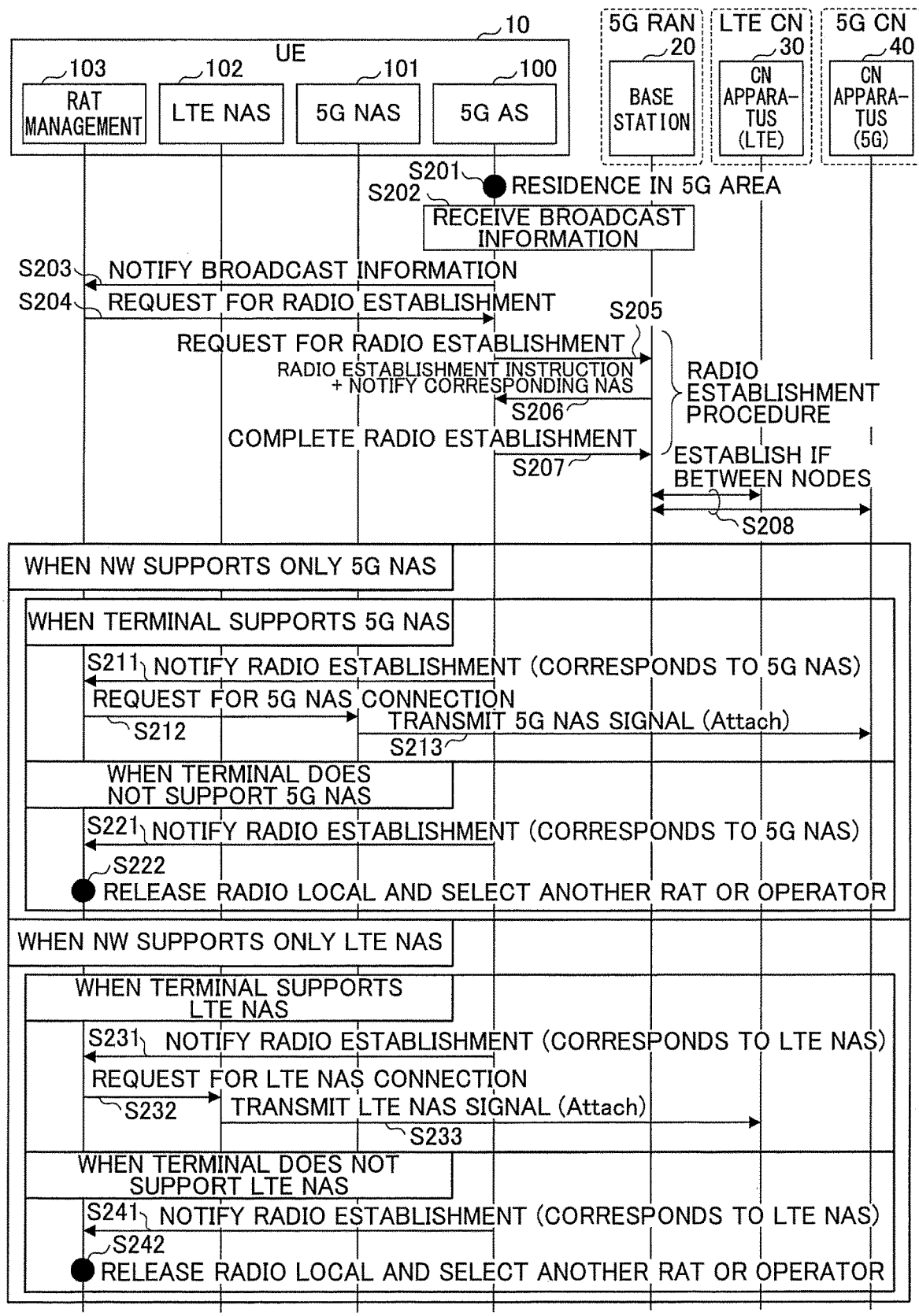
FIG. 7 is a sequence diagram illustrating an example of a process procedure performed by a radio communication system according to a second embodiment.
Figure 8:
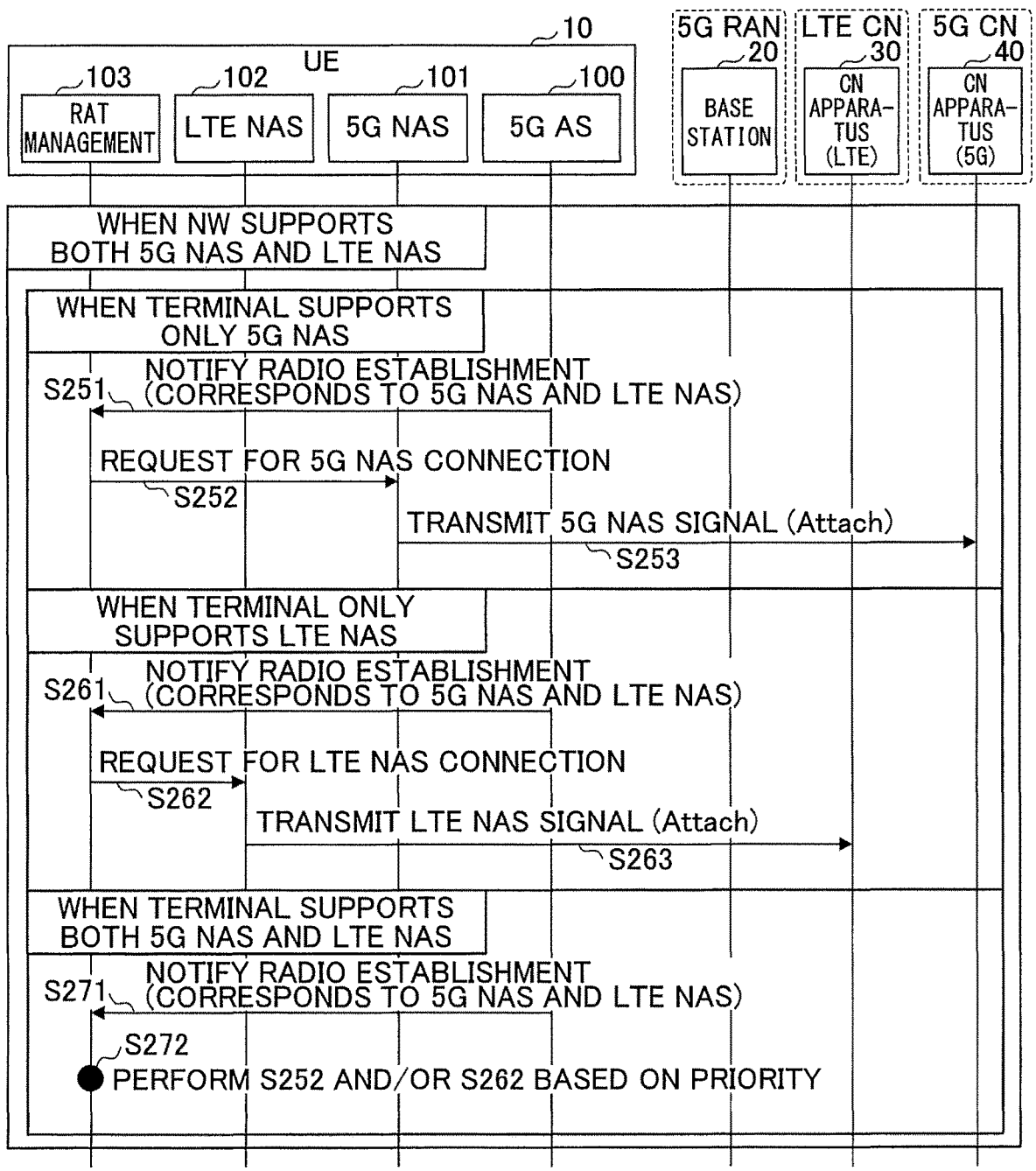
FIG. 8 is a sequence diagram illustrating an example of a process procedure performed by the radio communication system according to the second embodiment.
Figure 9:
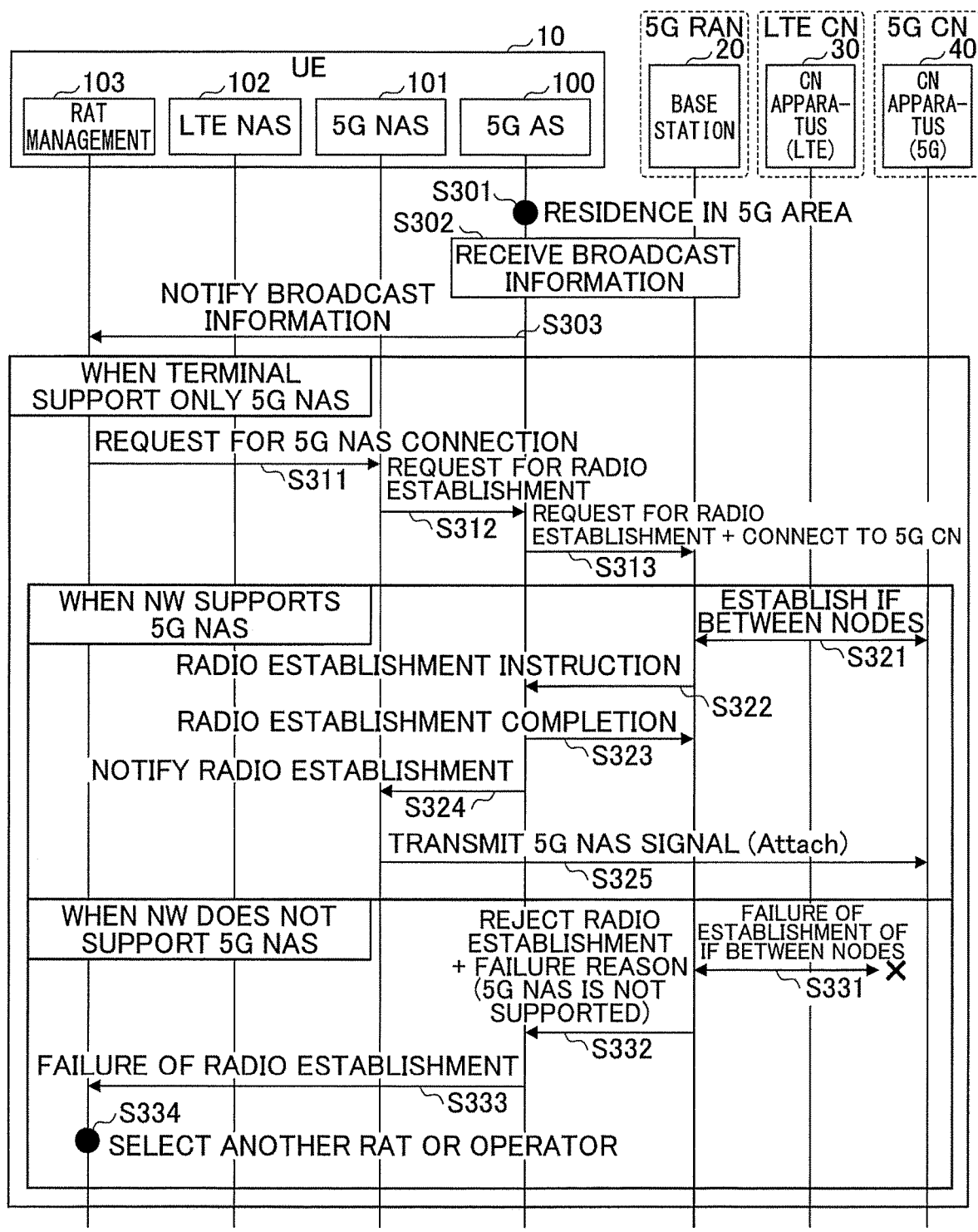
FIG. 9 is a sequence diagram illustrating an example of a process procedure performed by a radio communication system according to a third embodiment.
Figure 10:
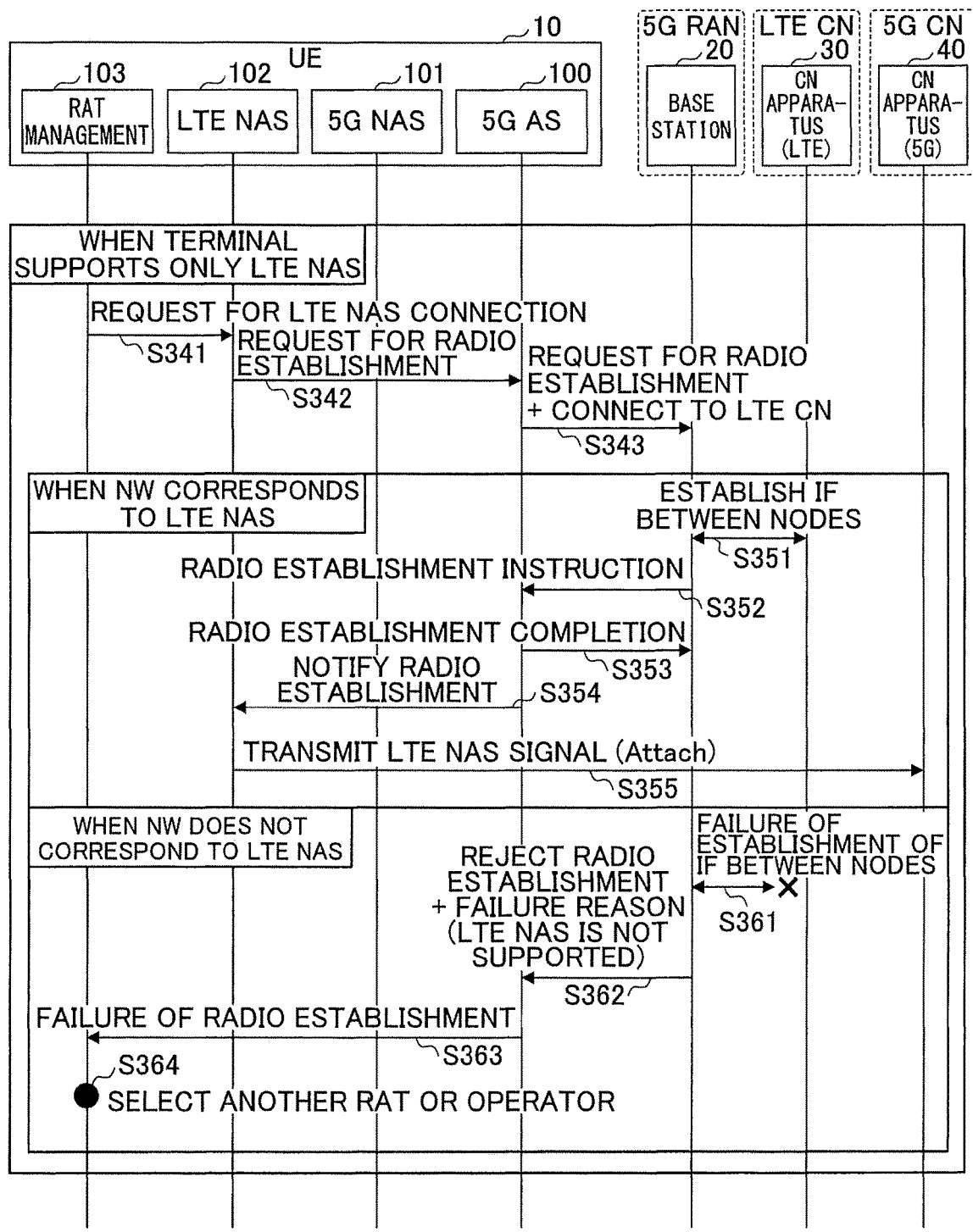
FIG. 10 is a sequence diagram illustrating an example of a process procedure performed by the radio communication system according to the third embodiment.
Figure 11:
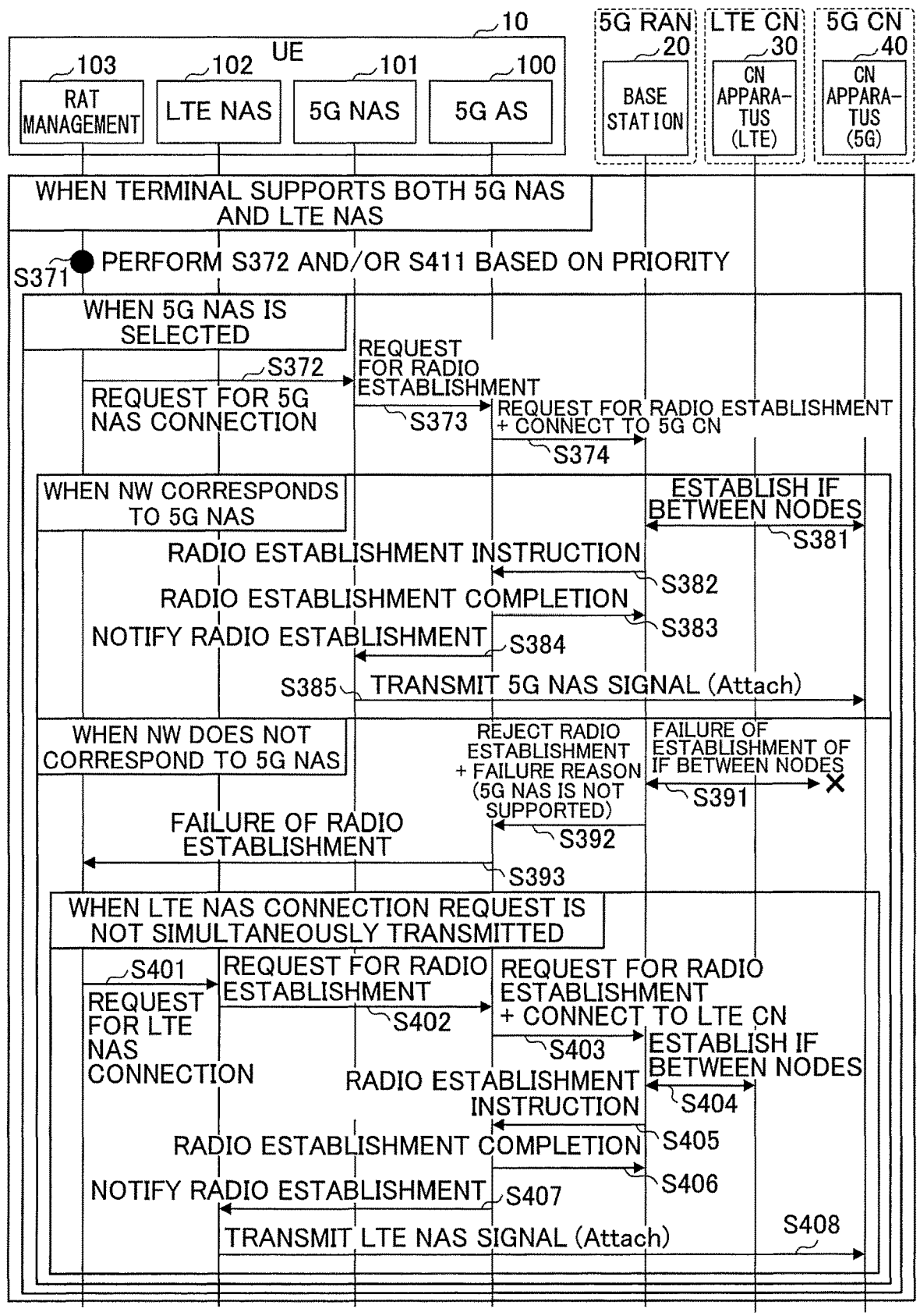
FIG. 11 is a sequence diagram illustrating an example of a process procedure performed by the radio communication system according to the third embodiment.
Figure 12:
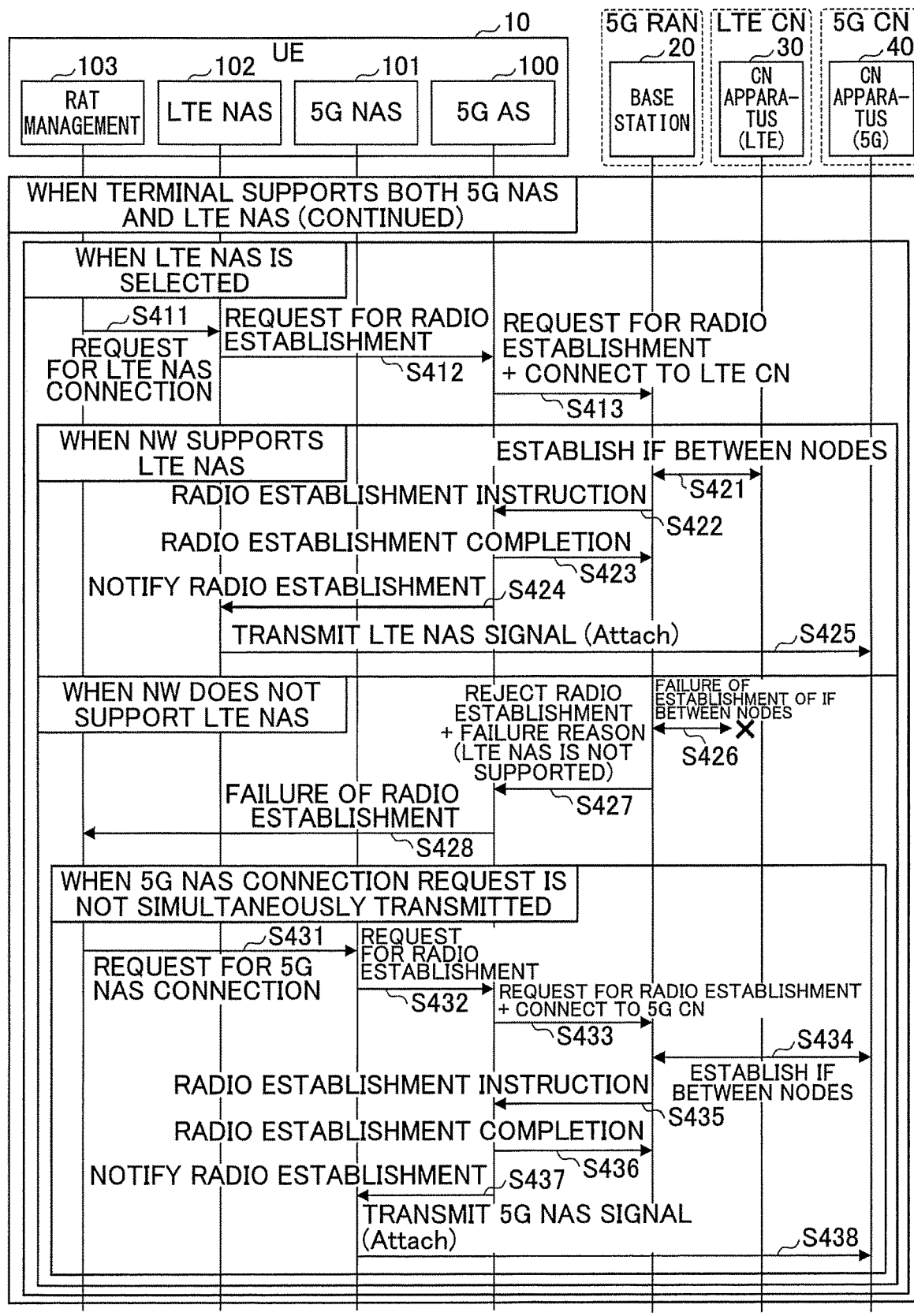
FIG. 12 is a sequence diagram illustrating an example of a process procedure performed by the radio communication system according to the third embodiment.
Figure 13:
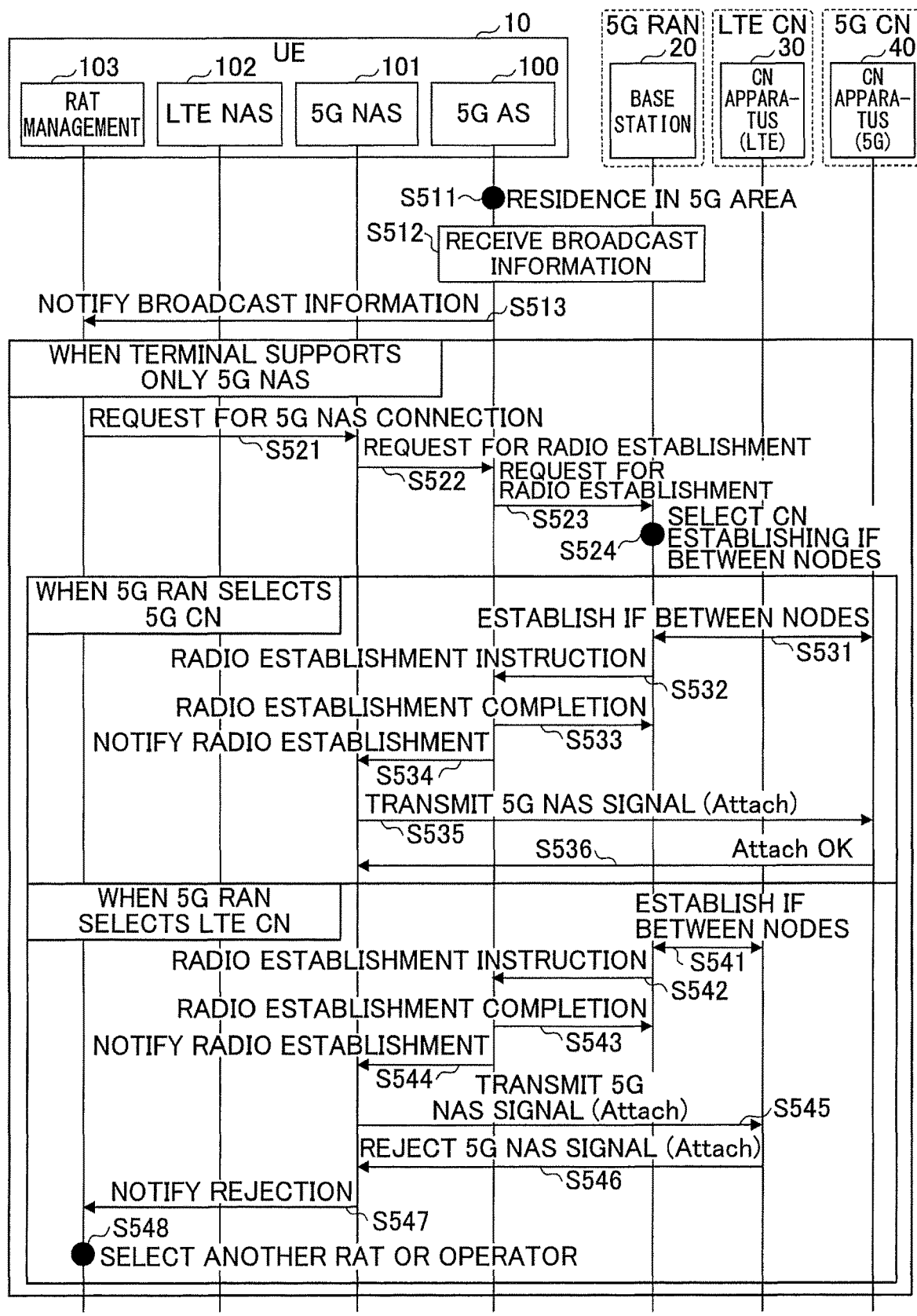
FIG. 13 is a sequence diagram illustrating an example of a process procedure performed by a radio communication system according to a fourth embodiment.
Figure 14:
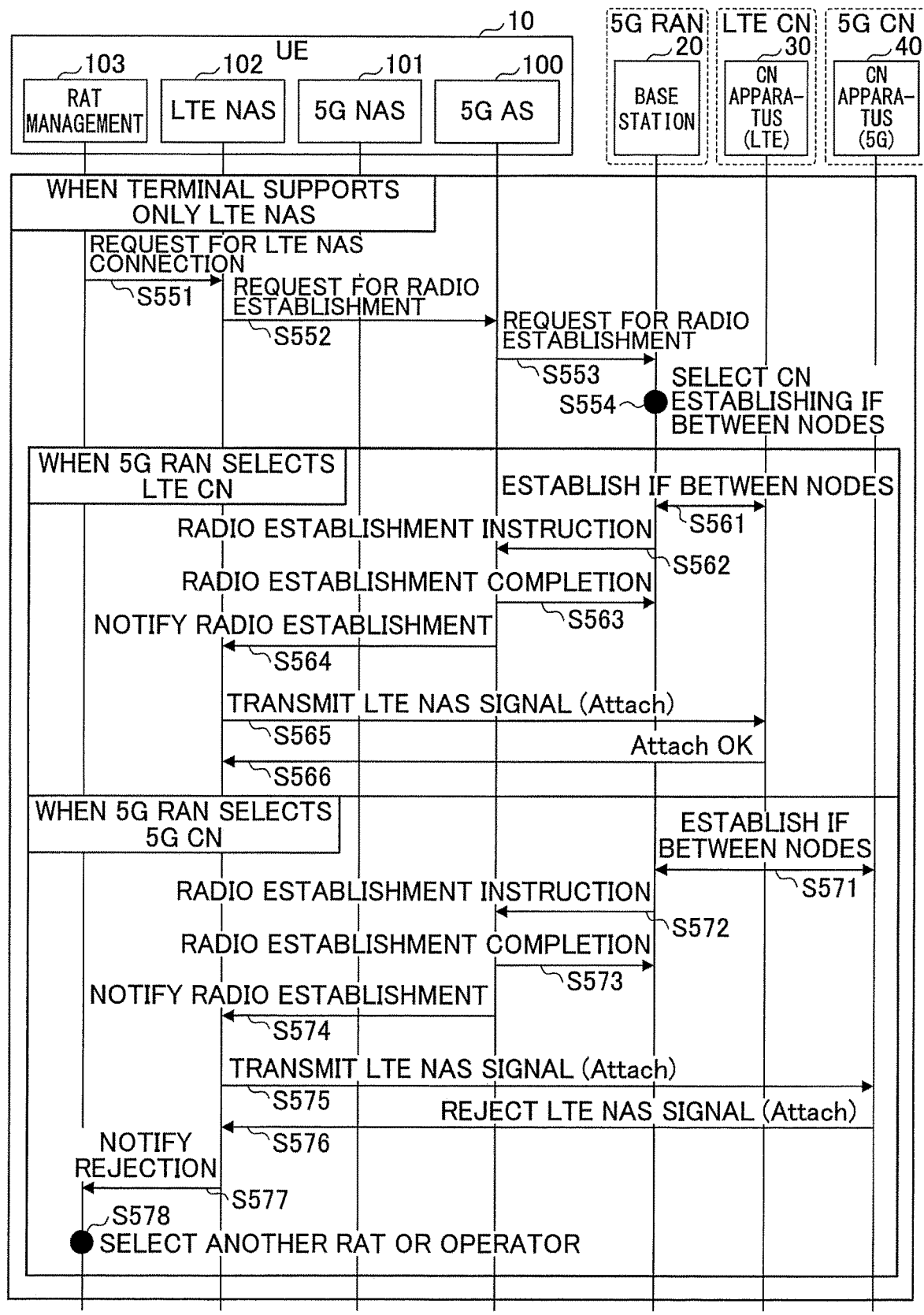
FIG. 14 is a sequence diagram illustrating an example of a process procedure performed by the radio communication system according to the fourth embodiment.
Figure 15:
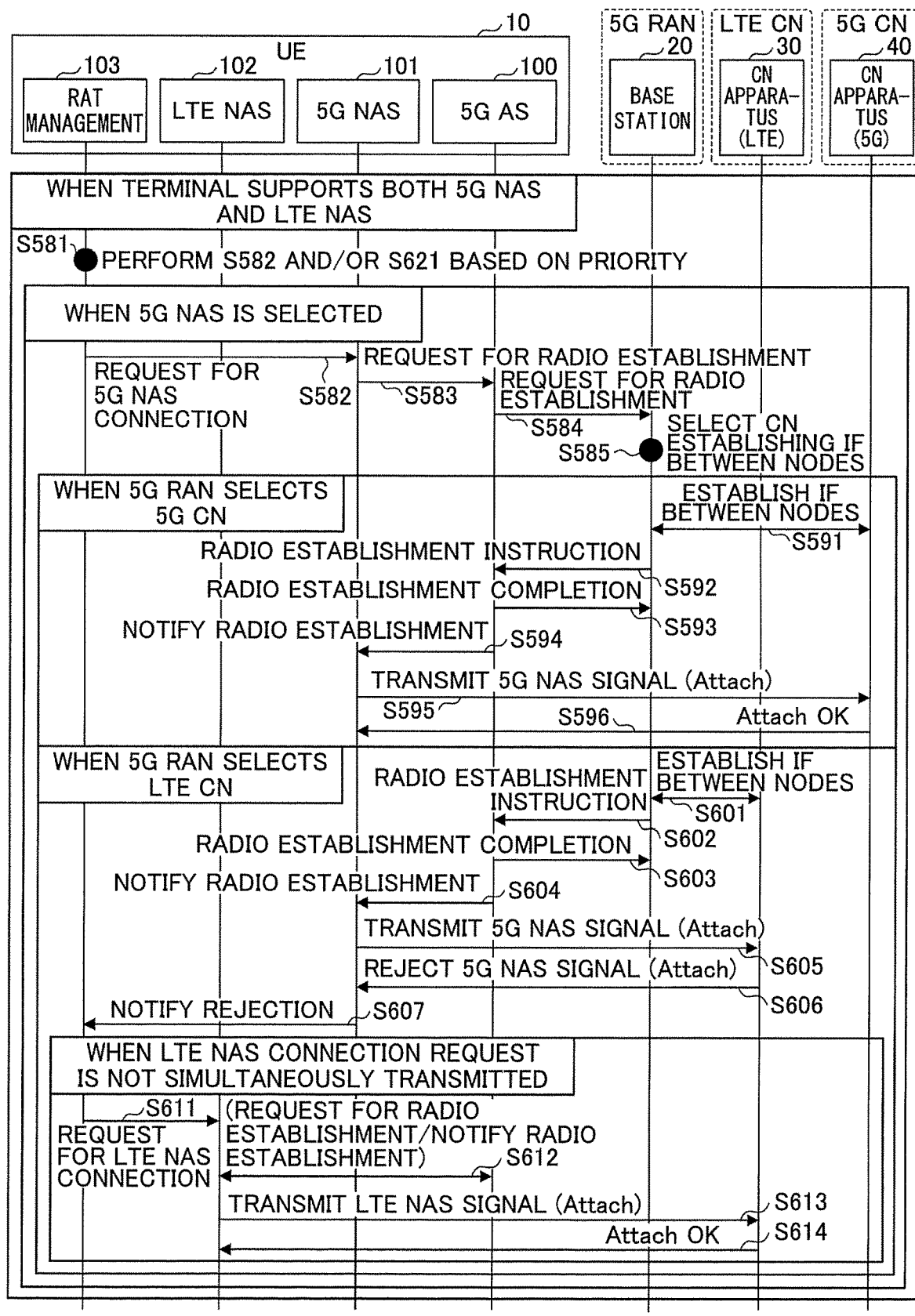
FIG. 15 is a sequence diagram illustrating an example of a process procedure performed by the radio communication system according to the fourth embodiment.
Figure 16:
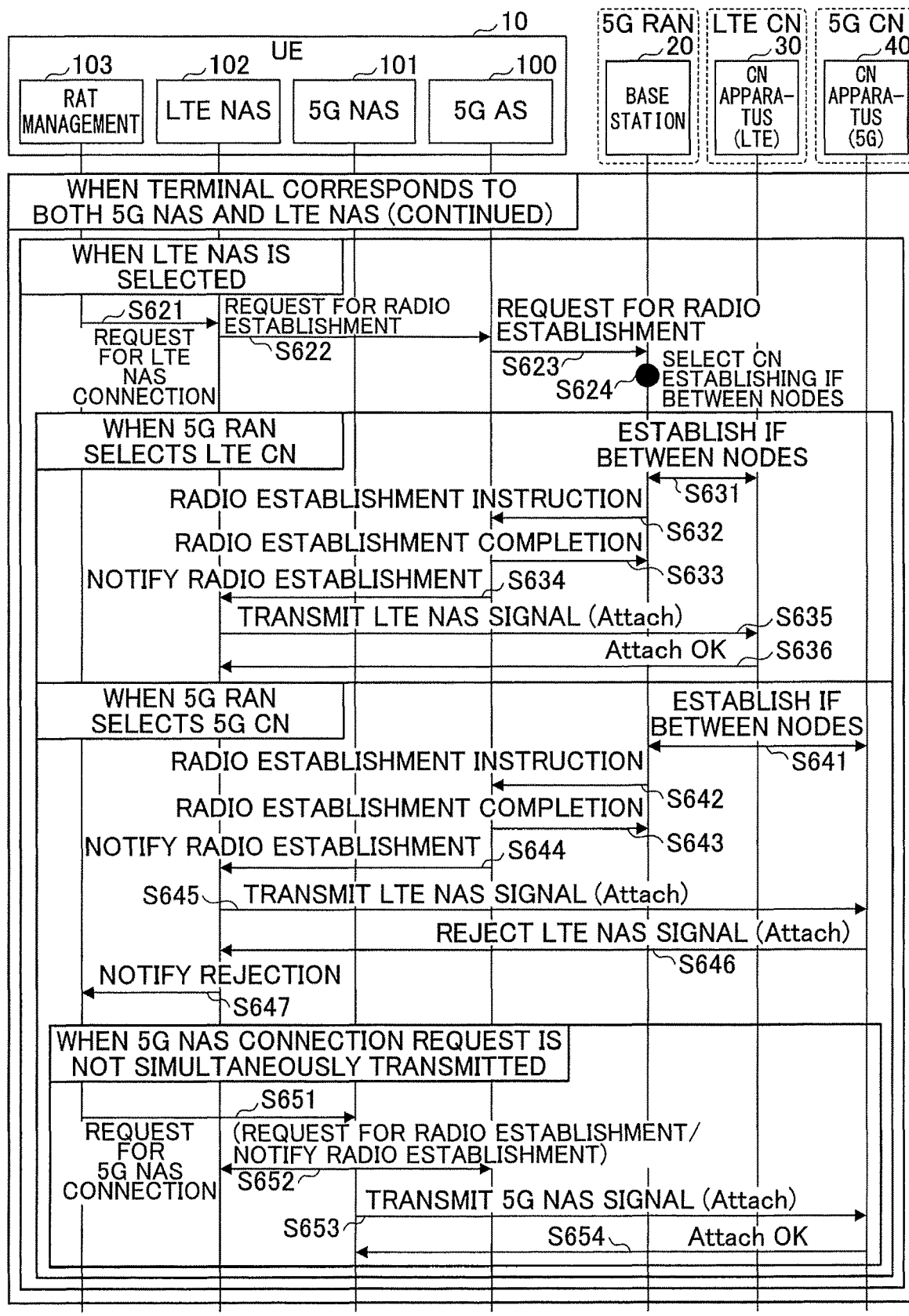
FIG. 16 is a sequence diagram illustrating an example of a process procedure performed by the radio communication system according to the fourth embodiment.

FIGS. 7 and 8 are sequence diagrams illustrating an example of a process procedure performed by the radio communication system according to the second embodiment.

The AS (5G) processing unit 100 of the UE 10 detects residence in a 5G area (S201) and receives report information from the base station 20 (S202). The AS (5G) processing unit 100 notifies the RAT management unit 103 of the report information (S203). The RAT management unit 103 requests the AS (5G) processing unit 100 to perform radio establishment (S204). The AS (5G) processing unit 100 transmits a radio establishment request to the base station 20 (S205) and the communication unit 200 of the base station 20 transmits a radio establishment instruction signal including a type of NAS protocol supported by the NW to the UE 10 (S206). The AS (5G) processing unit 100 notifies the base station 20 that the radio establishment is completed (S207). When the NW corresponds to the LTE NAS protocol, the communication unit 200 of the base station 20 establishes an interface (connection) to transmit and receive an NAS message with the CN apparatus (LTE) 30. When the NW corresponds to the 5G NAS protocol, the communication unit 200 of the base station 20 establishes an interface (connection) to transmit and receive an NAS message with the CN apparatus (5G) 40 (S208). When the NW corresponds to both the LTE NAS protocol and the 5G NAS protocol, the communication unit 200 of the base station 20 may establish an interface (connection) to transmit and receive the NAS message with both the CN apparatus (LTE) 30 and the CN apparatus (5G) 40.

When the NW corresponds to only the 5G NAS protocol and the UE 10 corresponds to the 5G NAS protocol, the AS (5G) processing unit 100 of the UE 10 notifies the RAT management unit 103 that the NW corresponds to only the 5G NAS protocol along with notification of the radio establishment (S211). The RAT management unit 103 requests the NAS (5G) processing unit 101 to perform NAS connection using the 5G NAS protocol (S212). The NAS (5G) processing unit 101 transmits the NAS message (attachment) of the 5G NAS protocol to the CN apparatus (5G) 40 (S213).

When the NW corresponds to only the 5G NAS protocol and the UE 10 does not correspond to the 5G NAS protocol, the AS (5G) processing unit 100 of the UE 10 notifies the RAT management unit 103 that the NW corresponds to only the 5G NAS protocol along with notification of radio establishment (S211). Since the UE 10 does not correspond to the 5G NAS protocol, the RAT management unit 103 instructs the AS (5G) processing unit 100 to open the radio connection with the base station 20 and selects residence in an area of another RAT (for example, LTE) or an area of another operator (S222).

When the NW corresponds to only the LTE NAS protocol and the UE 10 corresponds to the LTE NAS protocol, the AS (5G) processing unit 100 of the UE 10 notifies the RAT management unit 103 that the NW corresponds to only the LTE NAS protocol along with notification of the radio establishment (S231). The RAT management unit 103 requests the NAS (LTE) processing unit 102 to perform NAS connection using the LTE NAS protocol (S232). The NAS (LTE) processing unit 102 transmits the NAS message (attachment) of the LTE NAS protocol to the CN apparatus (LTE) 30 (S233).

When the NW corresponds to only the LTE NAS protocol and the UE 10 does not correspond to the LTE NAS protocol, the AS (5G) processing unit 100 of the UE 10 notifies the RAT management unit 103 that the NW corresponds to only the LTE NAS protocol along with notification of radio establishment (S241). Since the UE 10 does not correspond to the LTE NAS protocol, the RAT management unit 103 instructs the AS (5G) processing unit 100 to open the radio connection with the base station 20 and selects residence in an area of another RAT (for example, LTE) or an area of another operator (S242).

When the NW corresponds to both the 5G NAS protocol and the LTE NAS protocol and the UE 10 corresponds to only the 5G NAS protocol, the AS (5G) processing unit 100 of the UE 10 notifies the RAT management unit 103 that the NW corresponds to both the 5G NAS protocol and the LTE NAS protocol along with notification of the radio establishment (S251). The RAT management unit 103 requests the NAS (5G) processing unit 101 to perform NAS connection using the 5G NAS protocol (S252). The NAS (5G) processing unit 101 transmits the NAS message (attachment) of the 5G NAS protocol to the CN apparatus (5G) 40 (S253).

When the NW corresponds to both the 5G NAS protocol and the LTE NAS protocol and the UE 10 corresponds to only the LTE NAS protocol, the AS (5G) processing unit 100 of the UE 10 notifies the RAT management unit 103 that the NW corresponds to both the 5G NAS protocol and the LTE NAS protocol along with notification of the radio establishment (S261). The RAT management unit 103 requests the NAS (LTE) processing unit 102 to perform NAS connection using the LTE NAS protocol (S262). The NAS (LTE) processing unit 102 transmits the NAS message (attachment) of the LTE NAS protocol to the CN apparatus (LTE) 30 (S263).

When the NW and the UE 10 correspond to both the 5G NAS protocol and the LTE NAS protocol, respectively, the AS (5G) processing unit 100 of the UE 10 notifies the RAT management unit 103 that the NW corresponds to both the 5G NAS protocol and the LTE NAS protocol along with the notification of the radio establishment (S271). The RAT management unit 103 performs the NAS connection using the LTE NAS protocol based on information indicating priority and selects whether to perform NAS connection using the 5G NAS protocol (S272). When the NAS connection is performed using the 5G NAS protocol, the process proceeds to the process procedure of step S252. When the NAS connection is performed using the LTE NAS protocol, the process proceeds to the process procedure of S262. The RAT management unit 103 may perform both of the process procedure of step S252 and the process procedure of step S262 to attach both the CN apparatus (LTE) 30 and the CN apparatus (5G) 40.

The second embodiment has been described above. According to the second embodiment, the UE 10 can select the type of NAS protocol to be transmitted to the CN based on the type of NAS protocol supported by the CN.

Third Embodiment

In a third embodiment, in a radio establishment procedure performed with the base station 20, the UE 10 notifies of a type of NAS protocol scheduled to be used. When a type of NAS protocol not supported by the NW is notified of, the base station 20 rejects radio establishment or performs radio releasing. When the radio establishment is rejected or the radio releasing is performed and the UE 10 corresponds to both the types of 5G and LTE NAS protocols, the UE 10 notifies the base station 20 that a type of NAS protocol different from the rejected NAS message is scheduled to be used.

FIGS. 9 to 12 are sequence diagrams illustrating an example of a process procedure performed by the radio communication system according to the third embodiment.

The AS (5G) processing unit 100 of the UE 10 detects residence in a 5G area (S301) and receives report information from the base station 20 (S302). The AS (5G) processing unit 100 notifies the RAT management unit 103 of the report information (S303).

When the UE 10 corresponds to only the 5G NAS protocol, the RAT management unit 103 requests the NAS (5G) processing unit 101 to perform NAS connection using the 5G NAS protocol (S311). The NAS (5G) processing unit 101 requests the AS (5G) processing unit 100 to perform radio establishment (S312). The AS (5G) processing unit 100 notifies the base station 20 that the NAS message of the 5G NAS protocol is scheduled to be transmitted along with a request for the radio establishment (S313).

When the NW corresponds to the 5G NAS protocol, the communication unit 200 of the base station 20 establishes an interface (connection) to transmit and receive the NAS message with the CN apparatus (5G) 40 based on the notification (S321). The communication unit 200 of the base station 20 transmits a radio establishment instruction to the UE 10 (S322). The AS (5G) processing unit 100 of the UE 10 transmits a radio establishment completion to the base station 20 (S323). The AS (5G) processing unit 100 notifies the NAS (5G) processing unit 101 that the radio establishment is completed (S324). The NAS (5G) processing unit 101 transmits an NAS message (attachment) of the 5G NAS protocol to the CN apparatus (5G) 40 (S325).

When the NW does not correspond to the 5G NAS protocol, the communication unit 200 of the base station 20 fails in establishment of an interface (connection) for transmitting and receiving an NAS message with the CN apparatus (5G) 40 (S331). The communication unit 200 of the base station 20 notifies the UE 10 that the radio establishment is rejected and notifies the UE 10 that the NW does not correspond to the 5G NAS protocol as a failure reason (rejection reason) (S332). The AS (5G) processing unit 100 notifies the RAT management unit 103 of the failure of the radio establishment. Since the NW does not correspond to the 5G NAS protocol, the RAT management unit 103 selects residence in an area of another RAT (for example, LTE) or an area of another operator (S334).

When the UE 10 corresponds to only the LTE NAS protocol, the RAT management unit 103 requests the NAS (LTE) processing unit 102 to perform the NAS connection using the LTE NAS protocol (S341). The NAS (LTE) processing unit 102 requests the AS (5G) processing unit 100 to perform radio establishment (S342). The AS (5G) processing unit 100 requests the base station 20 to perform the radio establishment and notifies the base station 20 that the NAS message of the LTE NAS protocol is scheduled to be transmitted (S343).

When the NW corresponds to the LTE NAS protocol, the communication unit 200 of the base station 20 establishes an interface (connection) to transmit and receive the NAS message with the CN apparatus (LTE) 30 based on the notification (S351). The communication unit 200 of the base station 20 transmits a radio establishment instruction to the UE 10 (S352). The AS (5G) processing unit 100 of the UE 10 transmits a radio establishment completion to the base station 20 (S353). The AS (5G) processing unit 100 notifies the NAS (LTE) processing unit 102 that the radio establishment is completed (S354). The NAS (LTE) processing unit 102 transmits an NAS message (attachment) of the LTE NAS protocol to the CN apparatus (LTE) 30 (S355).

When the NW does not correspond to the LTE NAS protocol, the communication unit 200 of the base station 20 fails in establishment of an interface (connection) for transmitting and receiving an NAS message with the CN apparatus (LTE) 30 (S361). The communication unit 200 of the base station 20 notifies the UE 10 that the radio establishment is rejected and notifies the UE 10 that the NW does not correspond to the LTE NAS protocol as a failure reason (rejection reason) (S362). The AS (5G) processing unit 100 notifies the RAT management unit 103 of the failure of the radio establishment. Since the NW does not correspond to the LTE NAS protocol, the RAT management unit 103 selects residence in an area of another RAT (for example, 5G) or an area of another operator (S364).

When the UE 10 corresponds to both the 5G NAS protocol and the LTE NAS protocol and the UE 10 corresponds to only the 5G NAS protocol, the RAT management unit 103 selects execution of the NAS connection using the LTE NAS protocol or execution of the NAS connection using the 5G NAS protocol based on information indicating priority (S371). When the NAS connection is performed using the 5G NAS protocol, the process proceeds to the process procedure of step S372. When the NAS connection is performed using the LTE NAS protocol, the process proceeds to the process procedure of step S411. The RAT management unit 103 may perform both of the process procedure of step S372 and the process procedure of step S411 to attach both the CN apparatus (LTE) 30 and the CN apparatus (5G) 40.

When RAT management unit 103 selects the execution of the NAS connection using the 5G NAS protocol (S371), the RAT management unit 103 requests the NAS (5G) processing unit 101 to perform the NAS connection using the 5G NAS protocol (S372). The NAS (5G) processing unit 101 requests the AS (5G) processing unit 100 to perform the radio establishment (S373). The AS (5G) processing unit 100 requests the base station 20 to perform the radio establishment and notifies the base station 20 that the NAS message of the 5G NAS protocol is scheduled to be transmitted (S374).

When the NW corresponds to the 5G NAS protocol, the process procedure of steps S381 to S385 is performed. Since steps S381 to S385 in the process procedure are the same as steps S321 to S325, the description thereof will be omitted.

When the NW does not correspond to the 5G NAS protocol, the process procedure of steps S391 to S393 is performed. Since steps S391 to S393 in the process procedure are the same as steps S331 to S333, the description thereof will be omitted. Here, when the RAT management unit 103 performs neither the process procedure of step S372 nor the process procedure of step S411 to attach both the CN apparatus (LTE) 30 and the CN apparatus (5G) 40 (S371), the RAT management unit 103 performs the process procedure of steps S401 to S408. Since steps S401 to S403 in the process procedure are the same as steps S341 to S343, the description thereof will be omitted. Since steps S404 to S408 in the process procedure are the same as steps S351 to S355, the description thereof will be omitted.

When the RAT management unit 103 selects the execution of the NAS connection using the LTE NAS protocol (S371), the RAT management unit 103 requests the NAS (LTE) processing unit 102 to perform the NAS connection using the LTE NAS protocol (S411). The NAS (LTE) processing unit 102 requests to the AS (5G) processing unit 100 to perform the radio establishment (S412). The AS (5G) processing unit 100 requests the base station 20 to perform the radio establishment and notifies the base station 20 that the NAS message of the LTE NAS protocol is scheduled to be transmitted (S413).

When the NW corresponds to the LTE NAS protocol, the process procedure of steps S421 to S425 is performed. Since steps S421 to S425 in the process procedure are the same as steps S351 to S355, the description thereof will be omitted.

When the NW does not correspond to the LTE NAS protocol, the process procedure of steps S426 to S428 is performed. Since steps S426 to S428 in the process procedure are the same as steps S361 to S363, the description thereof will be omitted. Here, when the RAT management unit 103 performs neither the process procedure of step S372 nor the process procedure of step S411 to attach both the CN apparatus (LTE) 30 and the CN apparatus (5G) 40 (S371), the RAT management unit 103 performs the process procedure of steps S431 to S438. Since steps S431 to S433 in the process procedure are the same as steps S311 to S313, the description thereof will be omitted. Since steps S434 to S438 in the process procedure are the same as steps S321 to S325, the description thereof will be omitted.

The third embodiment has been described above. According to the third embodiment, when the UE 10 notifies the base station 20 of the NAS message of the type of NAS protocol desired to be transmitted by the UE 10 and is notified by the base station 20 that the NW does not correspond to the type of NAS protocol, the UE 10 can select another type of NAS protocol.

In the process procedure of step S313, the AS (5G) processing unit 100 notifies the base station 20 that the NAS message of the type of 5G NAS protocol is scheduled to be transmitted, the AS (5G) processing unit 100 may perform this notification in the process procedure of step S323. In this case, the process procedure of step S321 is performed after the process of step S323.

In the process procedure of step S343, the AS (5G) processing unit 100 notifies the base station 20 that the NAS message of the type of LTE NAS protocol is scheduled to be transmitted, but the AS (5G) processing unit 100 may perform this notification in the process procedure of step S353. In this case, the process procedure of step S351 is performed after the process of step S353.

In the process procedure of step 374 the AS (5G) processing unit 100 notifies the base station 20 that the NAS message of the type of 5G NAS protocol is scheduled to be transmitted, but the AS (5G) processing unit 100 may perform this notification in the process procedure of step S383. In this case, the process procedure of step S381 is performed after the process of step S383.

In the process procedure of step S403, the AS (5G) processing unit 100 notifies the base station 20 that the NAS message of the type of LTE NAS protocol is scheduled to be transmitted, but the AS (5G) processing unit 100 may perform this notification in the process procedure of step S406. In this case, the process procedure of step S404 is performed after the process of step S406.

In the process procedure of step S413, the AS (5G) processing unit 100 notifies the base station 20 that the NAS message of the type of LTE NAS protocol is scheduled to be transmitted, but the AS (5G) processing unit 100 may perform this notification in the process procedure of step S423. In this case, the process procedure of step S421 is performed after the process of step S423.

In the process procedure of step S433, the AS (5G) processing unit 100 notifies the base station 20 that the NAS message of the type of 5G NAS protocol is scheduled to be transmitted, but the AS (5G) processing unit 100 may perform this notification in the process procedure of step S436. In this case, the process procedure of step S434 is performed after the process procedure of step S436.

Fourth Embodiment

In a fourth embodiment, the UE 10 transmits the NAS message of the type of NAS protocol supported by the UE 10 to the NW. When the CN apparatus is notified of the NAS message of the type of NAS protocol not supported by the CN apparatus, the CN apparatus transmits a response message indicating rejection of the NAS message to the UE 10. When the NAS message is rejected and the UE 10 corresponds to both the types of 5G and LTE NAS protocols, the UE 10 transmits the NAS message of the type of NAS protocol different from the rejected NAS message to the CN apparatus.

FIGS. 13 to 16 are sequence diagrams illustrating an example of a process procedure performed by the radio communication system according to the fourth embodiment.

The AS (5G) processing unit 100 of the UE 10 detects residence in a 5G area (S511) and receives report information from the base station 20 (S512). The AS (5G) processing unit 100 notifies the RAT management unit 103 of the report information (S513).

When the UE 10 corresponds to only the 5G NAS protocol, the RAT management unit 103 requests the NAS (5G) processing unit 101 to perform NAS connection using the 5G NAS protocol (S521). The NAS (5G) processing unit 101 requests the AS (5G) processing unit 100 to perform radio establishment (S522). The AS (5G) processing unit 100 requests the base station 20 to perform the radio establishment (S523).

Here, the selection unit 201 of the base station 20 selects the CN apparatus establishing an interface (connection) to transmit and receive an NAS message based on the type of NAS protocol supported by the NW (S524). When the CN apparatus (5G) 40 is selected, the process proceeds to S531. When the CN apparatus (LTE) 30 is selected, the process proceeds to S541.

When the selection unit 201 of the base station 20 selects the CN apparatus (5G) 40 (S524), the communication unit 200 of the base station 20 establishes an interface (connection) to transmit and receive the NAS message with the CN apparatus (5G) 40 (S531). The communication unit 200 of the base station 20 transmits a radio establishment instruction to the UE 10 (S532). The AS (5G) processing unit 100 of the UE 10 transmits a radio establishment completion to the base station 20 (S533). The AS (5G) processing unit 100 notifies the NAS (5G) processing unit 101 that the radio establishment is completed (S534). The NAS (5G) processing unit 101 transmits an NAS message (attachment) of the 5G NAS protocol to the CN apparatus (5G) 40 (S535). The CN apparatus (5G) 40 transmits an NAS message (attach OK) to the UE 10 (S536).

When the selection unit 201 of the base station 20 selects the CN apparatus (LTE) 30 (S524), the communication unit 200 of the base station 20 establishes an interface (connection) to transmit and receive the NAS message with the CN apparatus (LTE) 30 (S541). The communication unit 200 of the base station 20 transmits a radio establishment instruction to the UE 10 (S542). The AS (5G) processing unit 100 of the UE 10 transmits a radio establishment completion to the base station 20 (S543). The AS (5G) processing unit 100 notifies the NAS (5G) processing unit 101 that the radio establishment is completed (S544). The NAS (5G) processing unit 101 transmits an NAS message (attachment) of the 5G NAS protocol to the CN apparatus (LTE) 30 (S545). Since the CN apparatus (LTE) 30 receives the NAS message not supported by the CN apparatus (LTE) 30, the CN apparatus (LTE) 30 transmits an NAS message for rejecting the NAS message (attachment) of the 5G NAS protocol to the UE 10 (S546). The NAS (5G) processing unit 101 notifies the RAT management unit 103 that the NAS message (attachment) is rejected (S547). Since the NW does not correspond to the 5G NAS protocol, the RAT management unit 103 selects residence in an area of another RAT (for example, LTE) or an area of another operator (S548).

When the UE 10 corresponds to only the LTE NAS protocol, the RAT management unit 103 requests the NAS (LTE) processing unit 102 to perform the NAS connection using the LTE NAS protocol (S551). The NAS (LTE) processing unit 102 requests the AS (5G) processing unit 100 to perform radio establishment (S552). The AS (5G) processing unit 100 requests the base station 20 to perform the radio establishment and notifies the base station 20 that the NAS message of the LTE NAS protocol is scheduled to be transmitted (S553).

Here, the selection unit 201 of the base station 20 selects the CN apparatus establishing an interface (connection) to transmit and receive an NAS message based on the type of NAS protocol supported by the NW (S554). When the CN apparatus (5G) 40 is selected, the process proceeds to S561. When the CN apparatus (LTE) 30 is selected, the process proceeds to S571.

When the selection unit 201 of the base station 20 selects the CN apparatus (LTE) 30 (S554), the communication unit 200 of the base station 20 establishes an interface (connection) to transmit and receive the NAS message with the CN apparatus (LTE) 30 (S561). The communication unit 200 of the base station 20 transmits a radio establishment instruction to the UE 10 (S562). The AS (5G) processing unit 100 of the UE 10 transmits a radio establishment completion to the base station 20 (S563). The AS (5G) processing unit 100 notifies the NAS (LTE) processing unit 102 that the radio establishment is completed (S564). The NAS (LTE) processing unit 102 transmits an NAS message (attachment) of the LTE NAS protocol to the CN apparatus (LTE) 30 (S565). The CN apparatus (LTE) 30 transmits an NAS message (attach OK) to the UE 10 (S566).

When the selection unit 201 of the base station 20 selects the CN apparatus (5G) 40 (S554), the communication unit 200 of the base station 20 establishes an interface (connection) to transmit and receive the NAS message with the CN apparatus (5G) 40 (S571). The communication unit 200 of the base station 20 transmits a radio establishment instruction to the UE 10 (S572). The AS (5G) processing unit 100 of the UE 10 transmits a radio establishment completion to the base station 20 (S573). The AS (5G) processing unit 100 notifies the NAS (LTE) processing unit 102 that the radio establishment is completed (S574). The NAS (LTE) processing unit 102 transmits an NAS message (attachment) of the LTE NAS protocol to the CN apparatus (LTE) 30 (S575). Since the CN apparatus (5G) 40 receives the NAS message not supported by the CN apparatus (5G) 40, the CN apparatus (5G) 40 transmits an NAS message for rejecting the NAS message (attachment) of the LTE NAS protocol to the UE 10 (S576). The NAS (LTE) processing unit 102 notifies the RAT management unit 103 that the NAS message (attachment) is rejected (S577). Since the NW does not correspond to the LTE NAS protocol, the RAT management unit 103 selects residence in an area of another RAT (for example, 5G) or an area of another operator (S578).

When the UE 10 corresponds to both the 5G NAS protocol and the LTE NAS protocol and the UE 10 corresponds to only the 5G NAS protocol, the RAT management unit 103 selects execution of the NAS connection using the LTE NAS protocol or execution of the NAS connection using the 5G NAS protocol based on information indicating priority (S581). When the NAS connection is performed using the 5G NAS protocol, the process proceeds to the process procedure of step S582. When the NAS connection is performed using the LTE NAS protocol, the process proceeds to the process procedure of S621. The RAT management unit 103 may perform both of the process procedure of step S582 and the process procedure of step S621 to attach both the CN apparatus (LTE) 30 and the CN apparatus (5G) 40.

When the RAT management unit 103 selects the execution of the NAS connection using the 5G NAS protocol (S581), the RAT management unit 103 requests the NAS (5G) processing unit 101 to perform the NAS connection using the 5G NAS protocol (S582). The NAS (5G) processing unit 101 requests the AS (5G) processing unit 100 to perform the radio establishment (S583). The AS (5G) processing unit 100 requests the base station 20 to perform the radio establishment (S584).

Here, the selection unit 201 of the base station 20 selects the CN apparatus establishing an interface (connection) to transmit and receive an NAS message based on the type of NAS protocol supported by the NW (S585). When the CN apparatus (5G) 40 is selected, the process proceeds to S591. When the CN apparatus (LTE) 30 is selected, the process proceeds to S601.

When the selection unit 201 of the base station 20 selects the CN apparatus (5G) 40 (S585), the process procedure of S591 to S596 is performed. Since the process procedure of S591 to S596 is the same as the process procedure of S531 to S536, the description thereof will be omitted.

When the selection unit 201 of the base station 20 selects the CN apparatus (LTE) 30 (S585), the process procedure of S601 to S614 is performed. Since the process procedure of S601 to S607 is the same as the process procedure of S541 to S547, the description thereof will be omitted. Here, when the RAT management unit 103 performs neither the process procedure of step S582 nor the process procedure of step S621 to attach both the CN apparatus (LTE) 30 and the CN apparatus (5G) 40 (S581), the RAT management unit 103 requests the NAS (LTE) processing unit 102 to perform the NAS connection using the LTE NAS protocol (S611). The NAS (LTE) processing unit 102 transmits a radio establishment request to the AS (5G) processing unit 100 and the AS (5G) processing unit 100 transmits a radio establishment response to the NAS (LTE) processing unit 102 (S612). The NAS (LTE) processing unit 102 transmits an NAS message (attachment) of the LTE NAS protocol to the CN apparatus (LTE) 30 (S613). The CN apparatus (LTE) 30 transmits an NAS message (attach OK) to the UE 10 (S614).

When the RAT management unit 103 selects the execution of the NAS connection using the LTE NAS protocol (S581), the RAT management unit 103 requests the NAS (LTE) processing unit 102 to perform the NAS connection using the LTE NAS protocol (S621). The NAS (LTE) processing unit 102 requests the AS (5G) processing unit 100 to perform the radio establishment (S622). The AS (5G) processing unit 100 requests the base station 20 to perform the radio establishment (S623).

Here, the selection unit 201 of the base station 20 selects the CN apparatus establishing an interface (connection) to transmit and receive an NAS message based on the type of NAS protocol supported by the NW (S624). When the CN apparatus (LTE) 30 is selected, the process proceeds to S631. When the CN apparatus (5G) 40 is selected, the process proceeds to S641.

When the selection unit 201 of the base station 20 selects the CN apparatus (LTE) 30 (S624), the process procedure of S631 to S636 is performed. Since the process procedure of S631 to S636 is the same as the process procedure of S561 to S566, the description thereof will be omitted.

When the selection unit 201 of the base station 20 selects the CN apparatus (5G) 40 (S624), the process procedure of S641 to S654 is performed. Since the process procedure of S641 to S647 is the same as the process procedure of S571 to S577, the description thereof will be omitted. Here, when the RAT management unit 103 performs neither the process procedure of step S582 nor the process procedure of step S621 to attach both the CN apparatus (LTE) 30 and the CN apparatus (5G) 40 (S581), the RAT management unit 103 requests the NAS (5G) processing unit 101 to perform the NAS connection using the 5G NAS protocol (S651). The NAS (5G) processing unit 101 transmits a radio establishment request to the AS (5G) processing unit 100 and the AS (5G) processing unit 100 transmits a radio establishment response to the NAS (5G) processing unit 101 (S652). The NAS (5G) processing unit 101 transmits an NAS message (attachment) of the 5G NAS protocol to the CN apparatus (5G) 40 (S653). The CN apparatus (5G) 40 transmits an NAS message (attach OK) to the UE 10 (S654).

The fourth embodiment has been described above. According to the fourth embodiment, when the UE 10 transmits the NAS message of the type of NAS protocol desired to be transmitted by the UE 10 to the CN apparatus and is notified by the CN apparatus that the NW does not correspond to the type of NAS protocol, the UE 10 can select another type of NAS protocol.

(Information Indicating Priority)

The "information indicating the priority" used in the first to fourth embodiments may be stored set in advance in the UE 10, may be stored in a USIM, or may be included in the report information. The information indicating the priority may be, for example, information prioritizing the 5G NAS protocol or information prioritizing the LTE NAS protocol. For example, the information indicating the priority may be information designating the NAS protocol prioritized based on the type of communication so that the LTE NAS protocol is used when communication using IMS is performed and the 5G NAS protocol is used when other communication is performed. When there is no correspondence to an IP multimedia subsystem (IMS) in a CN supporting 5G, a CN used according to a type of call can be switched in such a manner that an UE is connected to a CN supporting LTE at the time of calling an IMS voice and is connected to a CN supporting 5G at the time of calling a best effort packet.

(Supplements of Each Embodiment)

The base station 20 according to each embodiment is not limited to a base station supporting 5G RAT and may be a base station supporting LTE RAT. Each embodiment is not limited to the LTE scheme and the 5G scheme. Each embodiment may be applied to other radio schemes.

The UE 10 can switch a CN to be used by attaching both the CN apparatus (LTE) 30 and the CN apparatus (5G) 40.

<Conclusion>

As described above, according to an embodiment, there is provided user equipment of a radio communication system including the user equipment, a base station, and a core network apparatus. The user equipment includes a reception unit configured to receive information indicating one or more types of NAS protocols supported by the core network apparatus from the base station; a selection unit configured to select a type of a NAS protocol to be transmitted to the core network apparatus based on the information indicating the one or more type of the NAS protocols received by the reception unit; and a transmission unit configured to transmit a NAS message of the type of the NAS protocol selected by the selection unit to the core network apparatus. Thus, there is provided a technology for enabling the UE 10 to use an appropriate NAS protocol according to the network architecture.

When the core network apparatus supports a plurality of types of NAS protocols, the selection unit may select a type of a NAS protocol to be transmitted to the core network apparatus based on predetermined priority. Thus, the UE 10 can select a CN apparatus of an attachment destination based on, for example, a type of call or the like.

According to an embodiment, there is provided user equipment of a radio communication system including the user equipment, a base station, and a core network apparatus. The user equipment includes a selection unit configured to select a first type of a NAS protocol to be transmitted to the core network; and a transmission unit configured to transmit information indicating use of a NAS message of the first type of the NAS protocol selected by the selection unit to the base station or to transmit a NAS message of the first type of the NAS protocol selected by the selection unit to the core network apparatus. The selection unit selects a second type of a NAS protocol different from the first type of the NAS protocol when it is notified that the first type of the NAS protocol is not supported by the core network apparatus. The transmission unit transmits a NAS message of the second type of the NAS protocol selected by the selection unit to the core network apparatus. Thus, there is provided a technology for enabling the UE 10 to use an appropriate NAS protocol according to the network architecture.

When the user equipment supports a plurality of types of NAS protocols, the selection unit may select the first type of the NAS protocol to be transmitted to the core network apparatus based on predetermined priority. Thus, the UE 10 can select a CN apparatus of an attachment destination based on, for example, a type of call or the like.

According to an embodiment, there is provided a radio communication system including user equipment; a base station; a first core network apparatus configured to support a first type of a NAS protocol; and a second core network apparatus configured to support a second type of a NAS protocol. The base station includes a transmission unit that transmits information indicating that the radio communication system supports the first type of the NAS protocol and the second type of the NAS protocol to the user equipment. The user equipment includes a reception unit that receives the information from the base station, a selection unit that selects a type of a NAS protocol to be transmitted to the first core network apparatus or the second core network apparatus based on the information received by the reception unit, and a transmission unit that transmits a NAS message of the first type of the NAS protocol to the first core network apparatus when the selection unit selects the first type of the NAS protocol, transmits a NAS message of the second type of the NAS protocol to the second core network apparatus when the selection unit selects the second type of the NAS protocol, and transmits the NAS message of the first type of the NAS protocol and the NAS message of the second type of the NAS protocol to the first and second core network apparatuses, respectively, when the selection unit selects the first and second types of the NAS protocols. In the radio communication system, there is provided a technology for enabling the UE to use an appropriate NAS protocol according to the network architecture.

According to an embodiment, there is provided a communication method to be performed by user equipment of a radio communication system including the user equipment, a base station, and a core network apparatus. The communication method includes receiving information indicating one or more types of NAS protocols supported by the core network apparatus from the base station; selecting a type of a NAS protocol to be transmitted to the core network apparatus based on the information indicating the received type of the NAS protocol; and transmitting a NAS message of the selected type of the NAS protocol to the core network apparatus. In the communication method, there is provided a technology for enabling the UE to use an appropriate NAS protocol according to the network architecture.

<Supplements of Embodiments>

Each aspect/embodiment described in the present specification may be applied to a system in which Long Term Evolution (LTE), LTE-Advanced (LTE-A), SUPER 3G, IMT-Advanced, 4G, 5G, Future Radio Access (FRA), W-CDMA (registered trademark), GSM (registered trademark), CDMA2000, Ultra Mobile Broadband (UMB), IEEE 802.11 (Wi-Fi), IEEE 802.16 (WiMAX), IEEE 802.20, Ultra-WideBand (UWB), Bluetooth (registered trademark), and other appropriate systems are used and/or a next generation system extended based on the system.

The order of the process procedure, the sequence, the flowchart, or the like of each aspect/embodiment described in the present specification may be interchanged unless there is contradiction. For example, in the method described in the present specification, elements of various steps have been proposed in exemplary orders and the invention is not limited to the proposed specific orders.

The aspects/embodiments described in the present specification may be singly used, may be combined, or may be switched and used in accordance with execution. In addition, notification of predetermined information (for example, notification of "being X") is not limited to being performed explicitly and may be performed implicitly (for example, the notification of the predetermined information is not performed).

The terms "system" and "network" used in the present specification are compatibly used.

The UE 10 is referred to as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agency, a mobile client, a client, or several other appropriate terms by those skilled in the art in some cases.

The term "determining" used in the present specification include a wide variety of operations in some cases. The "determining" can include cases in which performing, for example, judging, calculating, computing, processing, deriving, investigating, looking up (for example, looking up in a table, a database, or another data structure), and ascertaining is considered to perform "determining." In addition, the "determining" can include cases in which performing, for example, receiving (for example, receiving information), transmitting (for example, transmitting information), inputting, outputting, and accessing (for example, accessing data in a memory) is considered to perform "determining." In addition, the "determining" can include cases in which performing, for example, resolving, selecting, choosing, establishing, and comparing is considered to be perform "determining." That is, the "determining" can include a case in which any operation is considered to perform "determining."

The term "connected" or "coupled" or all modifications of the term means all direct or indirect connection or coupling between two or more elements and can include presence of one or more intermediate elements between two mutually "connected" or "coupled" elements. The connection or the coupling between elements may be physical connection, logical connection, or any combination thereof. When the connection or the coupling is used in the present specification, two elements can be considered to be mutually "connected" or "coupled" by using one or more electric wires, cables, and/or printed electric connection and using electromagnetic energy such as electromagnetic energy with a wavelength of a radio frequency region, a microwave region, and a light (both visible light and invisible light) region as several non-limited and non-inclusive examples.

The description "based on" used in the present specification does not imply "based on only" as long as otherwise mentioned. In other words, the description of "based on" implies both of "based on only" and "based on at least."

When reference to elements in which names "first," "second," and the like used in the present specification are used is made, the amount or order of the elements is not limited generally either. The names can be used in the present specification as methods used to conveniently distinguish two or more elements from each other. Accordingly, reference to first and second elements does not imply that only two elements are employed or a first element is prior to a second element in a certain form.

Throughout the present disclosure, for example, when the article such as a, an, and the in English is added in translation, the article is assumed to include plurality unless indicated that the article is not clear in a context.

Notification of information is not limited the aspect/embodiment described in the present specification any may be performed by other methods. For example, notification of information may be performed via physical layer signaling (for example, Downlink Control Information (DCI) or Uplink Control Information (UCI)), upper-layer signaling (for example, RRC signaling, MAC signaling, broadcast information (Master Information Block (MIB), or System Information Block (SIB)), other signals, or by a combination thereof. Moreover, an RRC message may be referred to as the RRC signaling. Furthermore, the RRC message may be an RRC connection setup (RRC Connection Setup) message, a RRC connection reconfiguration (RRC Connection Reconfiguration) message, or the like, for example.

Determination or decision may be made by a value (0 or 1) represented by one bit, may be made by a Boolean value (Boolean: true or false), and may be made by comparison of numerical values (comparison with a predetermined value, for example).

Note that the terms described in this specification and/or the terms necessary for understanding of this specification may be replaced with terms having the same or similar meaning. For example, the channel and/or symbol may be signaling (signal). Furthermore, a signal may be a message.

Input and output Information and the like may be stored in a specific location (for example, a memory) and may be managed by a management table. The input and output information and the like may be overwritten, updated, or rewritten. The output information and the like may be erased. The input information and the like may be transmitted to other apparatuses.

Information, signals, and the like described in the present specification may be represented using any of various other techniques. For example, data, instructions, commands, information, signals, bits, symbols, chips, and the like mentioned in the entire description may be represented by voltage, current, electromagnetic waves, magnetic field or magnetic particles, optical field or photons, or any combination thereof.

The invention has been described in detail above, it should be apparent to those skilled in the art that the invention is not limited to the embodiments described in the present specification. The invention can be embodied in correction and change aspects without departing from the gist and scope of the invention described in the claims. Accordingly, the description of the present specification is intended to describe examples and does not have meanings limited to the invention.

In each embodiment, the AS (5G) processing unit 100 is an example of a reception unit. The RAT management unit 103 is an example of a selection unit. The NAS (5G) processing unit 101 and/or the NAS (LTE) processing unit 102 are an example of a transmission unit. The communication unit 200 is an example of the transmission unit.

This international patent application is based on and claims priority to Japanese Patent Application No. 2016-136422 filed on Jul. 8, 2016, and the entire content of Japanese Patent Application No. 2016-136422 is incorporated herein by reference.

LIST OF REFERENCE SYMBOLS

10 UE
20 base station
30 CN apparatus (LTE)
40 CN apparatus (5G)
100 AS (5G) processing unit
101 NAS (5G) processing unit
102 NAS (LTE) processing unit
103 RAT management unit
200 communication unit
201 selection unit
1001 processor
1002 memory
1003 storage
1004 communication device
1005 input device
1006 output device

The invention claimed is:

1. User equipment of a radio communication system including the user equipment, a base station, and a core network apparatus, the user equipment comprising:
   a reception unit configured to receive information indicating one or more types of NAS protocols supported by the core network apparatus from the base station;
   a selection unit configured to select a type of a NAS protocol supported by the core network apparatus to be transmitted to the core network apparatus based on the information indicating the one or more types of NAS protocols received by the reception unit; and
   a transmission unit configured to transmit a NAS message of the type of NAS protocol supported by the core network apparatus selected by the selection unit to the core network apparatus,
   wherein the core network supports 5G.

2. The user equipment according to claim 1,
   wherein when the core network apparatus supports a plurality of types of NAS protocols, the selection unit selects a type of a NAS protocol to be transmitted to the core network apparatus based on predetermined priority.

3. User equipment of a radio communication system including the user equipment, a base station, and a core network apparatus, the user equipment comprising:
   a selection unit configured to select a first type of a NAS protocol to be transmitted to the core network; and
   a transmission unit configured to transmit information indicating use of a NAS message of the first type of the NAS protocol selected by the selection unit to the base station or to transmit a NAS message of the first type of the NAS protocol selected by the selection unit to the core network apparatus,
   wherein the selection unit selects a second type of a NAS protocol supported by the core network apparatus different from the first type of the NAS protocol when it is notified that the first type of the NAS protocol is not supported by the core network apparatus,
   wherein the transmission unit transmits a NAS message of the second type of the NAS protocol supported by the core network apparatus selected by the selection unit to the core network apparatus, and
   wherein the core network supports 5G.

4. The user equipment according to claim 3,
wherein when the user equipment supports a plurality of types of NAS protocols, the selection unit selects the first type of the NAS protocol to be transmitted to the core network apparatus based on predetermined priority.

5. A radio communication system comprising:
user equipment;
a base station;
a first core network apparatus configured to support a first type of a NAS protocol; and
a second core network apparatus configured to support a second type of a NAS protocol,
wherein the base station includes a transmission unit configured to transmit information indicating that the radio communication system supports the first type of the NAS protocol and the second type of the NAS protocol to the user equipment, and
wherein the user equipment includes
a reception unit configured to receive the information from the base station,
a selection unit configured to select a type of a NAS protocol to be transmitted to the first core network apparatus or the second core network apparatus based on the information received by the reception unit, and
a transmission unit configured to transmit an NAS message of the first type of the NAS protocol supported by the first core network apparatus to the first core network apparatus when the selection unit selects the first type of the NAS protocol, transmit a NAS message of the second type of the NAS protocol supported by the second core network apparatus to the second core network apparatus when the selection unit selects the second type of the NAS protocol, and transmit the NAS message of the first type of the NAS protocol supported by the first core network apparatus and the NAS message of the second type of the NAS protocol supported by the second core network apparatus to the first and second core network apparatuses, respectively, when the selection unit selects the first and second types of the NAS protocols,
wherein the core network supports 5G.

6. A communication method performed by user equipment of a radio communication system including the user equipment, a base station, and a core network apparatus, the communication method comprising:
receiving information indicating one or more types of NAS protocols supported by the core network apparatus from the base station;
selecting a type of a NAS protocol supported by the core network apparatus to be transmitted to the core network apparatus based on the information indicating the received type of the NAS protocol; and
transmitting a NAS message of the selected type of the NAS protocol supported by the core network apparatus to the core network apparatus,
wherein the core network supports 5G.

* * * * *